United States Patent
Okumura et al.

(10) Patent No.: US 12,001,018 B2
(45) Date of Patent: Jun. 4, 2024

(54) DEVICE, METHOD AND PROGRAM FOR IMPROVING COOPERATION BETWEEN TELE-EXISTENCE AND HEAD-MOUNTED DISPLAY

(71) Applicants: Sony Group Corporation, Tokyo (JP); Sony Interactive Entertainment Inc., Tokyo (JP)

(72) Inventors: Yasushi Okumura, Tokyo (JP); Yukari Konishi, Tokyo (JP); Fumihiko Iida, Tokyo (JP); Ryuichi Suzuki, Tokyo (JP); Kotaro Imamura, Tokyo (JP)

(73) Assignees: Sony Group Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/259,093

(22) PCT Filed: Dec. 24, 2021

(86) PCT No.: PCT/JP2021/048240
§ 371 (c)(1),
(2) Date: Jun. 23, 2023

(87) PCT Pub. No.: WO2022/149497
PCT Pub. Date: Jul. 14, 2022

(65) Prior Publication Data
US 2024/0053604 A1     Feb. 15, 2024

Related U.S. Application Data

(60) Provisional application No. 63/133,873, filed on Jan. 5, 2021.

(51) Int. Cl.
*G02B 27/00*     (2006.01)
*G02B 27/01*     (2006.01)
(Continued)

(52) U.S. Cl.
CPC ....... *G02B 27/0093* (2013.01); *G02B 27/017* (2013.01); *G02B 27/0179* (2013.01);
(Continued)

(58) Field of Classification Search
CPC ........................... G02B 27/0093; G06F 3/012
See application file for complete search history.

(56) References Cited

U.S. PATENT DOCUMENTS

2013/0194305 A1    8/2013   Kakuta

FOREIGN PATENT DOCUMENTS

JP    2014072576 A    4/2014
JP    2018007180 A    1/2018
(Continued)

OTHER PUBLICATIONS

International Search Report for corresponding Application PCT/JP2021/048240, 4 pages, dated Mar. 14, 2022.

*Primary Examiner* — Gustavo Polo
(74) *Attorney, Agent, or Firm* — Matthew B. Dernier, Esq.

(57) ABSTRACT

A control device generates a first image in which, together with an object in the real world appearing in an image captured by a camera of a robot, a virtual object appears and which presents an exterior appearance of the virtual object while the position of the camera of the robot is set as a view-point. An HMD displays the first image generated by the control device. In a case in which the position of the HMD in the height direction changes, the control device generates a second image from which the object in the real world is deleted and which presents the exterior appearance of the virtual object viewed from a new view-point according to the change in the position of the HMD in the height direction. The HMD displays the second image in place of the first image.

5 Claims, 13 Drawing Sheets

(51) Int. Cl.
*G05D 1/00* (2006.01)
*G06F 3/01* (2006.01)
*G06T 19/00* (2011.01)

(52) U.S. Cl.
CPC .......... *G05D 1/0246* (2013.01); *G06F 3/012* (2013.01); *G06T 19/006* (2013.01); *G02B 2027/0187* (2013.01)

(56) References Cited

FOREIGN PATENT DOCUMENTS

| | | |
|---|---|---|
| WO | 2012029576 A1 | 3/2012 |
| WO | 2019176035 A1 | 9/2019 |

FIG. 5

| CHARACTER NAME | | CHARACTER A | CHARACTER B | CHARACTER C | CHARACTER D |
|---|---|---|---|---|---|
| CHARACTERISTIC | | VERY CURIOUS | FRIENDLY | BRAVE (DO THINGS AT OWN PACE) | TIMID |
| ROUTE SEARCH | GAP TO OBSTACLE | NARROW | NARROW | MEDIUM | WIDE |
| | SMOOTHNESS OF ROUTE | STRAIGHT LINE | STRAIGHT LINE | MEDIUM | SMOOTH |
| | STOPOVER (PERSON) | MEDIUM | FREQUENT | NONE | NONE |
| | STOPOVER (THING) | MEDIUM | NONE | NONE | NONE |
| | GOAL POSITION (PERSON) | NEAR | NEAR | MEDIUM | FAR |
| SPEED | MOVEMENT SPEED CHANGE (ACCELERATION) | LARGE | LARGE (ONLY FOR PERSON) | MEDIUM | SMALL |
| | NORMAL MOVEMENT SPEED | FAST | MEDIUM | MEDIUM | SLOW |
| | HEAD SWING SPEED | FAST | MEDIUM | MEDIUM | SLOW |
| RANGE OF TARGET OF INTEREST | FOR PERSON | WIDE | WIDE | NARROW | WIDE |
| | FOR OBSTACLE | WIDE | NARROW | NARROW | WIDE |
| | PERSON/THING PRIORITY | PERSON = THING | PERSON > THING | PERSON = THING | PERSON = THING |

DEVICE, METHOD AND PROGRAM FOR IMPROVING COOPERATION BETWEEN TELE-EXISTENCE AND HEAD-MOUNTED DISPLAY

TECHNICAL FIELD

The present invention relates to a data processing technology and particularly relates to an information processing device, an information processing method, and a computer program.

BACKGROUND ART

In recent years, there has emerged a technology called tele-existence which uses a robot positioned at a remote location, as an alter ego of a user himself or herself. The robot which is present at the remote location transmits image data and sound data on the periphery, and the image data and the sound data are reproduced on the user side, thereby enabling the user to experience such a sense of presence that the user is present at the location of the robot.

Moreover, a head-mounted display (HMD) is used in various fields. It is possible to increase a sense of immersion into the video world by implementing a head tracking function in the HMD, to thereby update a display screen operationally in association with a posture of the head portion of the user.

SUMMARY

Technical Problems

The present inventors focused on a possibility of cooperation between the tele-existence and the head-mounted display and has developed a technology for improving user experience by the cooperation between the tele-existence and the head-mounted display.

The present invention has been made based on recognition of the above-described problem by the present inventors and has one object to provide a technology for improving user experience achieved by cooperation between the tele-existence and the head-mounted display.

Solution to Problem

In order to solve the problem described above, an information processing device according to an aspect of the present invention includes an acquisition unit that acquires an image in which an object in a real world captured by an imaging device appears, an image generation unit that generates a first image in which a virtual object appears together with the object in the real world appearing in the image acquired by the acquisition unit and which presents an exterior appearance of the virtual object while a position of the imaging device is set as a view-point, a display control unit that causes a head-mounted display to display the first image generated by the image generation unit, and a detection unit that detects a change in a position of the head-mounted display in a height direction. In a case in which the position of the head-mounted display in the height direction changes, the image generation unit generates a second image from which the object in the real world is deleted and which presents the exterior appearance of the virtual object viewed from a new view-point according to the change in the position of the head-mounted display in the height direction, and the display control unit causes the head-mounted display to display the second image in place of the first image.

Another aspect of the present invention is an information processing method. In this information processing method, a step of acquiring an image in which an object in a real world captured by an imaging device appears, a step of generating a first image in which a virtual object appears together with the object in the real world appearing in the image acquired in the acquisition step and which presents an exterior appearance of the virtual object while a position of the imaging device is set as a view-point, a step of causing a head-mounted display to display the first image generated by the generation function, a step of detecting a change in a position of the head-mounted display in a height direction, a step of generating, in a case in which the position of the head-mounted display in the height direction changes, a second image from which the object in the real world is deleted and which presents the exterior appearance of the virtual object viewed from a new view-point according to the change in the position of the head-mounted display in the height direction, and a step of causing the head-mounted display to display the second image in place of the first image are executed by a computer.

Note that any combination of the foregoing components and any conversion of the expressions of the present invention from/to systems, computer programs, recording media having recorded thereon computer programs in a readable manner, data structures, and the like are also effective as aspects of the present invention.

Advantageous Effect of Invention

According to the present invention, the user experience achieved by the cooperation between the tele-existence and the head-mounted display can be improved.

BRIEF DESCRIPTION OF DRAWINGS

FIG. 5 is a table for illustrating an example of character data.

DESCRIPTION OF EMBODIMENTS

First Embodiment

A description is now given of an overview of a first embodiment. In recent years, there have been provided various types of entertainment robots such as pet robots, but the entertainment robots of related art are robots into each of which a personality of a single character is built. In the first embodiment, there is proposed an entertainment system which causes an entertainment robot to carry out an operation corresponding to a personality of a character desired by a user, among a plurality of characters having different personalities. Note that the character in the embodiments can also be referred to as an "avatar" as an alter ego of the user or a friend.

Figure 1:
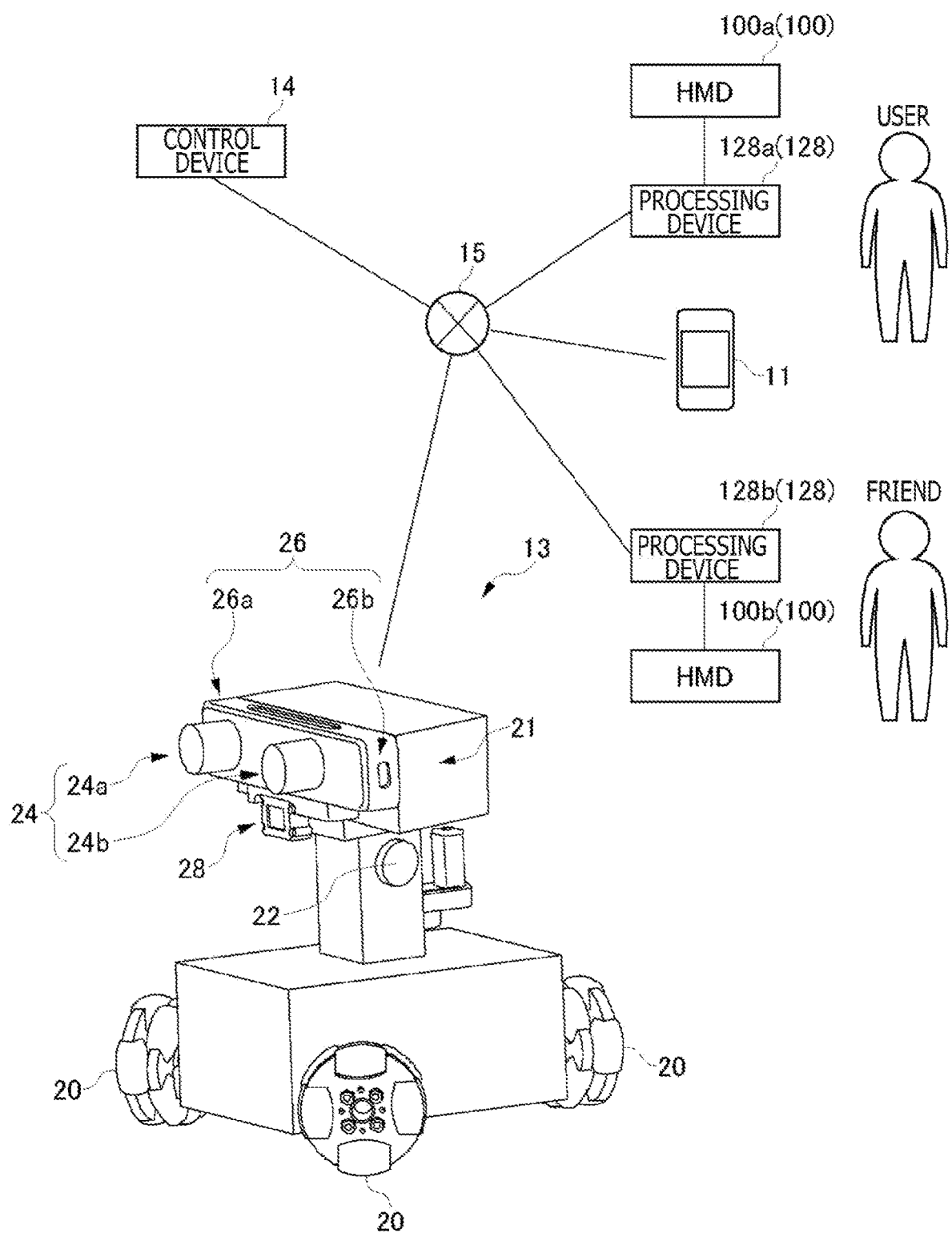
FIG. 1 is a diagram for illustrating a configuration example of an information processing system according to an embodiment.

FIG. 1 illustrates a configuration example of an entertainment system 10 according to the first embodiment. The entertainment system 10 is an information processing system which provides, to the user, entertainment experience in which a robot is used. The entertainment system 10 includes a user terminal 11, an HMD 100a, and a processing device 128a operated by the user, an HMD 100b and a processing device 128b operated by another user (hereinafter referred to as a "friend") registered by the user as the friend, a robot 13, and a control device 14. These devices have a function for wired communication and/or wireless communication and are connected to each other via a communication network 15 which can include a local area network (LAN), a wide area network (WAN), the Internet, and the like.

The user terminal 11 is a cellular phone provided with an operating system for a mobile use, and is, for example, a smartphone or a tablet terminal.

The HMD 100a is a head-mounted display device worn on the head portion by the user. The processing device 128a is an information processing device which controls display of an image (for example, a virtual reality (VR) image, an AR image, and the like) in the HMD 100a. The "image" in the embodiments includes a still image and a motion image. The processing device 128a receives an operation which is input by the user and is directed to the robot 13, and transmits information regarding this operation (hereinafter also referred to as "user operation information") to the control device 14. The user operation information includes sound data representing voice of the user collected by a microphone of the HMD 100a.

The HMD 100b is a head-mounted display device worn on the head portion by the friend. The processing device 128b is an information processing device which controls display of an image in the HMD 100b. The processing device 128b receives an operation which is input by the friend and is directed to the robot 13, and transmits information regarding this operation (hereinafter also referred to as "friend operation information") to the control device 14. The friend operation information includes sound data representing voice of the friend collected by a microphone of the HMD 100b.

Hereinafter, in a case in which the HMD 100a and the HMD 100b are not particularly distinguished from each other, each of the HMD 100a and the HMD 100b is referred to as an "HMD 100." Moreover, in a case in which the processing device 128a and the processing device 128b are not particularly distinguished from each other, each of the processing device 128a and the processing device 128b is referred to as a "processing device 128." The processing device 128 may be a personal computer (PC) or a game of a stationary type or a mobile type. The HMD 100 and the processing device 128 may integrally be formed, and, for example, the HMD 100 may include the function of the processing device 128. In this case, there may be provided such a configuration that the HMD 100 and the control device 14 communicate with each other via the communication network 15.

The robot 13 is a self-propelled robot having an overall width of 192 mm, an overall height of 167 mm, and a depth of 166 mm. The robot 13 includes a travel drive unit 20, a head drive unit 22, a right camera 24a, a left camera 24b, a right microphone 26a, a left microphone 26b, and a speaker 28. In a case in which the right camera 24a and the left camera 24b are not particularly distinguished from each other, each of the right camera 24a and the left camera 24b is referred to as a "camera 24." Moreover, in a case in which the right microphone 26a and the left microphone 26b are not particularly distinguished from each other, each of the right microphone 26a and the left microphone 26b is referred to as a "microphone 26." The speaker 28 outputs sound data received from an external device.

The travel drive unit 20 includes three omni wheels. Each omni wheel moves back and forth by rotation of a body (wheel) on a shaft and moves left and right by rotation of rollers in a circumferential form, and movements in many directions are achieved by a combination thereof. The head drive unit 22 turns a head portion 21 of the robot 13 about three axes. The three axes include a pitch axis about which the head turns in the up and down direction, a roll axis about which the head turns in a tilting direction, and a yaw axis about which the head turns laterally.

The right camera 24a and the left camera 24b are provided to the head portion 21. The right camera 24a and the left camera 24b are arranged apart from each other by a predetermined gap in the lateral direction. The right camera 24a and the left camera 24b form a stereo camera, the right camera 24a captures an image for the right eye at a predetermined cycle, and the left camera 24b captures an image for the left eye at the predetermined cycle. A height (eye height) of attachment positions of the right camera 24a and the left camera 24b are 144 mm.

The right microphone 26a and the left microphone 26b are provided to the head portion 21. The right microphone 26a and the left microphone 26b are arranged apart from each other by a predetermined gap in the lateral direction. The right microphone 26a and the left microphone 26b form a stereo microphone, and are configured to be different from each other in arrival time of sound according to the position of a sound source as a result of the arrangement apart in the lateral direction by the predetermined gap. The difference in arrival time of sound appears as a phase difference between sound signals generated by the right microphone 26a and the left microphone 26b. Note that, in order to increase the phase difference between the sound signals of the right microphone 26a and the left microphone 26b, it is preferred that the right microphone 26a and the left microphone 26b be arranged to be apart from each other as much as possible.

The control device 14 is an information processing device which determines the operation of the robot 13 to control the operation of the robot 13. A detailed configuration of the control device 14 is described later.

Figure 2:
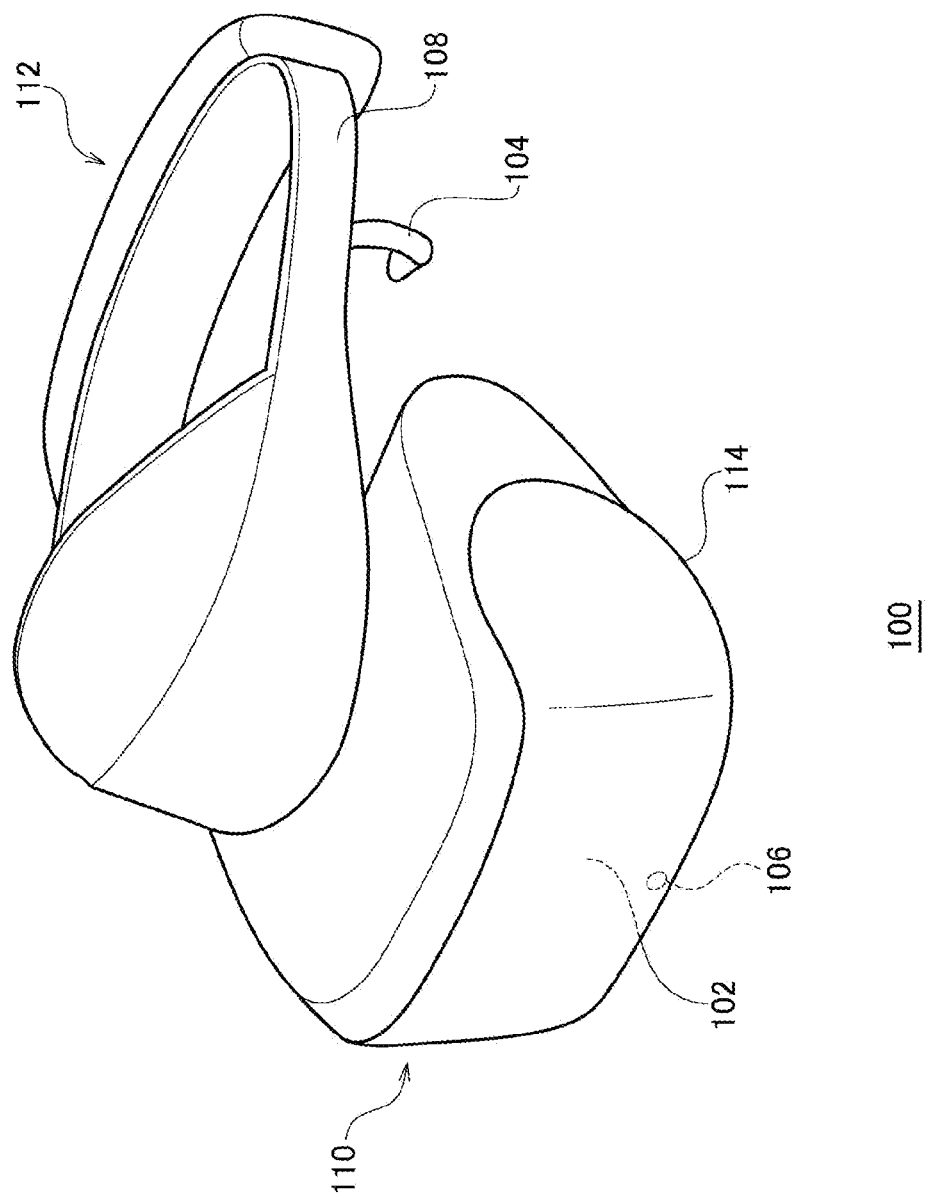
FIG. 2 is a view for illustrating an example of an exterior shape of an HMD.

FIG. 2 illustrates an example of an exterior shape of the HMD 100. In this example, the HMD 100 includes an output mechanism unit 110 and a wearing mechanism unit 112. The wearing mechanism unit 112 includes a wearing band 108 which runs around the head portion when the wearing band 108 is worn by the user, to secure the HMD 100 to the head portion. The wearing band 108 has a material or a structure which allows adjustment of a length thereof according to a head circumference of the user.

The output mechanism unit 110 includes a housing 114 having such a shape as to cover the left and right eyes in a state in which the user is wearing the HMD 100, and is internally provided with a display panel 102 at a position directly facing the eyes. The display panel 102 may be a liquid crystal panel, an organic electroluminescent (EL) panel, or the like. Inside the housing 114 are provided a pair of left and right optical lenses which are positioned between the display panel 102 and the eyes of the user and increase a viewing angle of the user.

The HMD 100 further includes earphones 104 to be inserted into the ears of the user when the HMD 100 is worn by the user. Note that the earphones 104 are an example of sound output means, and the HMD 100 may include a headphone. With this configuration, the HMD 100 and the headphone may be formed integrally, or may be formed independently.

The HMD 100 transmits sensor information detected by a posture sensor and sound data obtained by encoding the sound signal from a microphone 106, to the control device 14 via the processing device 128. Moreover, the HMD 100 receives image data and sound data generated by the control device 14 (robot 13), via the processing device 128, and outputs the image data and the sound data from the display panel 102 and the earphones 104, respectively.

Note that the HMD 100 illustrated in FIG. 2 represents a display device of an immersive type (non-transmission type) which fully covers both eyes, but may be a display device of a transmission type. Moreover, the shape thereof may be a cap type as illustrated, but may be an eyeglass type. Note that the HMD 100 is not only the dedicated head-mounted display device, but may include a terminal device including a display panel, a microphone, and a speaker and a housing which fixes the display panel of the terminal device at a position in front of the eyes of the user. The terminal device may be a device which includes a relatively small display panel, for example, a smartphone or a portable game machine.

Figure 3:
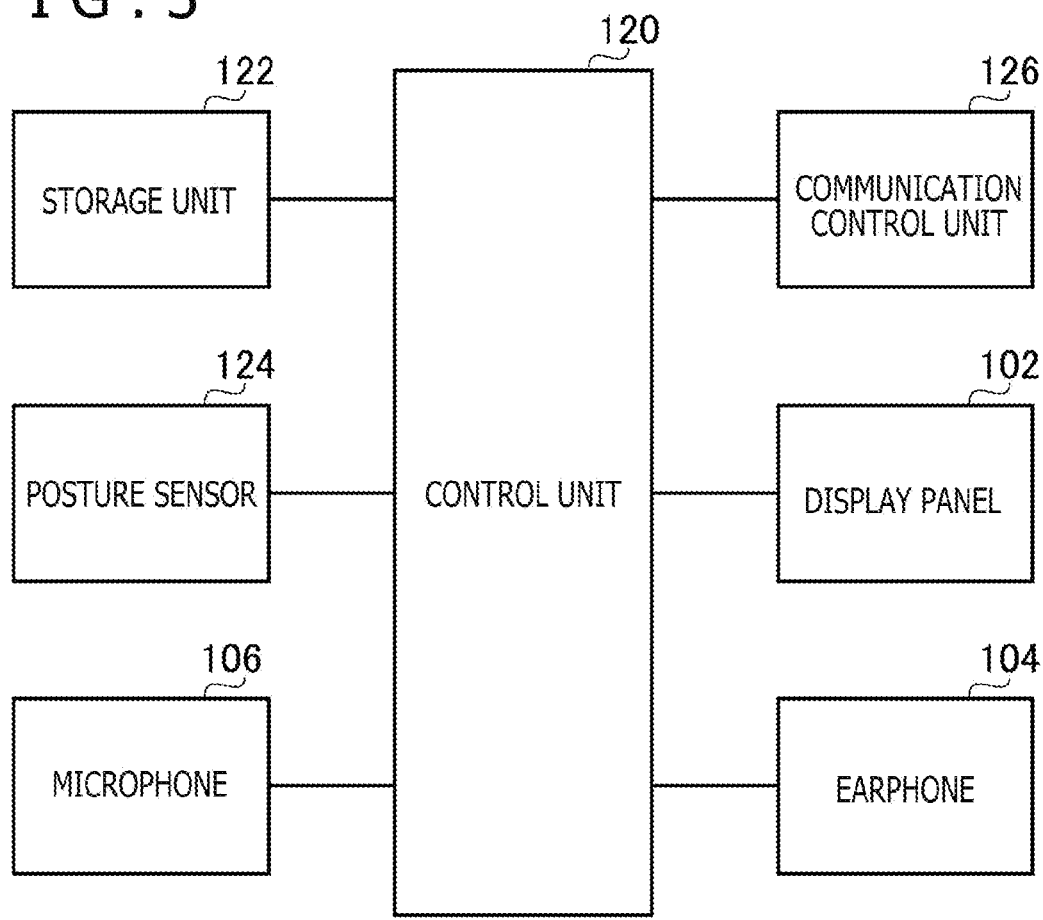
FIG. 3 is a block diagram for illustrating function blocks of the HMD.

FIG. 3 is a block diagram for illustrating function blocks of the HMD 100. In block diagrams herein, each block can be implemented by elements and electronic circuits such as a processor, a central processing unit (CPU), and a memory of a computer and mechanical devices in terms of hardware and are implemented by computer programs and the like in terms of software, and function blocks implemented by cooperation thereof are herein drawn. It is thus understood by a person skilled in the art that these function blocks can be implemented in various forms by the combination of the hardware and the software.

A control unit 120 is a main processor which processes and outputs various types of signals such as the image signal, the sound signal, and the sensor information, data, and commands. A storage unit 122 temporarily stores the data, the commands, and the like to be processed by the control unit 120. A posture sensor 124 detects posture information such as rotation angles and inclinations of the HMD 100 at a predetermined cycle. The posture sensor 124 includes at least a three-axis acceleration sensor and a three-axis gyro sensor. Moreover, the posture sensor 124 includes a sensor which detects a position (or a change therein) of the HMD 100 in the height direction. The microphone 106 converts the voice of the user into an electric signal to generate the sound signal.

A communication control unit 126 transmits and receives signals and data to and from the control device 14 by wired or wireless communication via a network adaptor or an antenna. In the embodiments, the communication control unit 126 transmits and receives the signals and the data to and from the control device 14 via the processing device 128. The communication control unit 126 receives, from the control unit 120, the posture information (for example, the position in the height direction and/or the change in the position in the height direction of the HMD 100) detected by the posture sensor 124 and the sound data obtained by encoding the sound signal from the microphone 106, and transmits the posture information and the sound data to the control device 14.

Moreover, the communication control unit 126 receives the image data and the sound data transmitted from the control device 14 and provides the image data and the sound data to the control unit 120. When the control unit 120 receives the image data and the sound data transmitted from the control device 14, the control unit 120 supplies the image data to the display panel 102 to cause the display panel 102 to display the image data, and supplies the sound data to the earphones 104 to cause the earphones 104 to output the sound data as sound.

Figure 4:
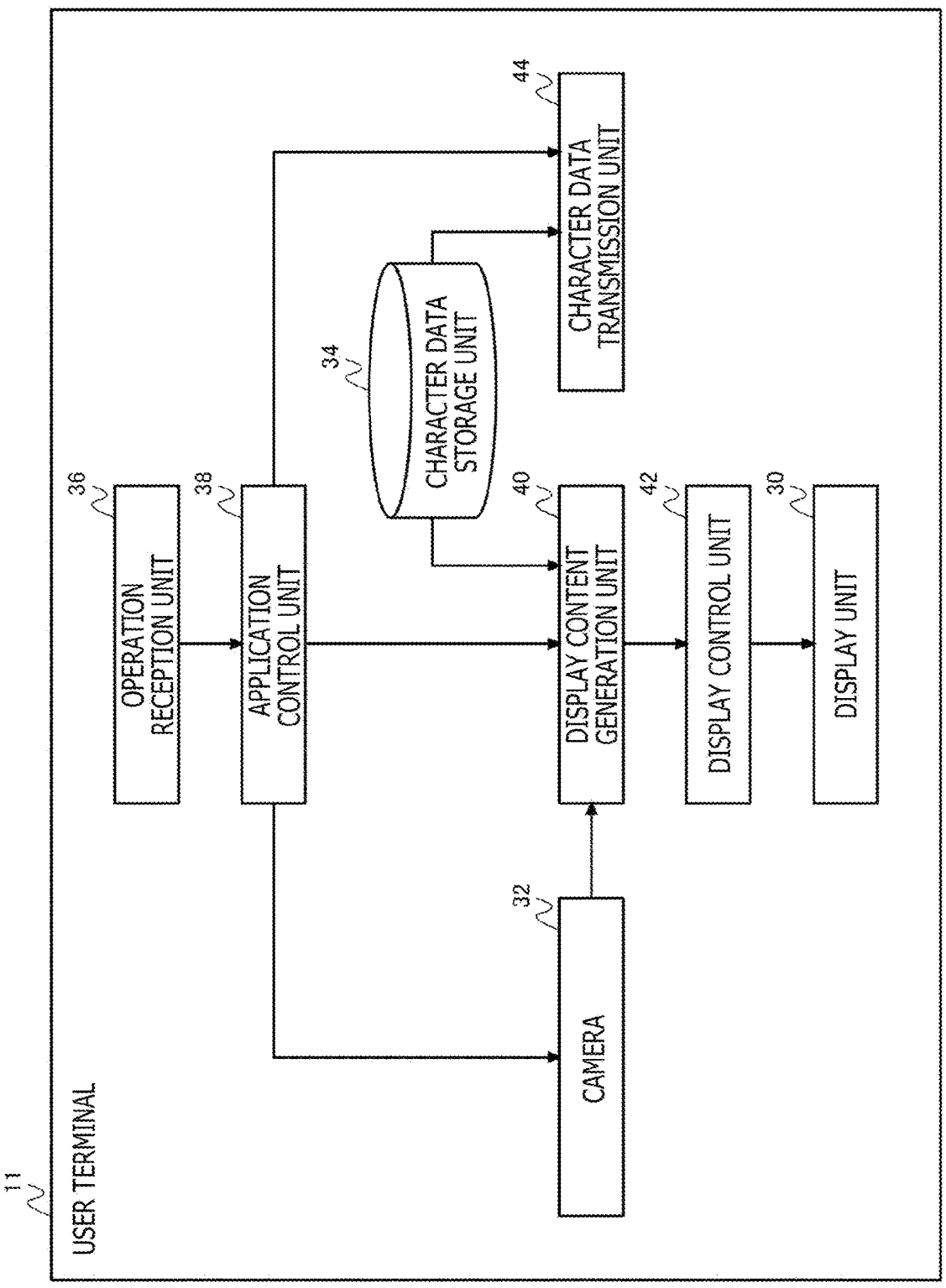
FIG. 4 is a block diagram for illustrating function blocks of a user terminal.

FIG. 4 is a block diagram for illustrating function blocks of the user terminal 11. The user terminal 11 includes a display unit 30, a camera 32, a character data storage unit 34, an operation reception unit 36, an application control unit 38, a display content generation unit 40, a display control unit 42, and a character data transmission unit 44.

The display unit 30 displays various types of information. The display unit 30 may include a liquid crystal panel or an organic EL panel. Moreover, the display unit 30 includes a function of a touch panel (in other words, a touch screen). The camera 32 is an imaging device which images a state around the user terminal 11 (for example, objects which are present around the user terminal 11).

The character data storage unit 34 stores data (hereinafter also referred to as "character data") regarding a plurality of characters which the user can select and for which different personalities are defined. FIG. 5 illustrates an example of the character data. A characteristic of being very curious is assigned to a character A, a friendly characteristic is assigned to a character B, a brave characteristic is assigned to a character C, and a timid characteristic is assigned to a character D. To each character, various types of attribute values (also referred to as "parameters") are defined to match the assigned characteristic.

A parameter (1) "route search—gap to obstacle" defines whether a gap secured by the robot 13 to an obstacle (for example, a person or a thing) detected on a route is wide or narrow. For example, a value corresponding to "narrow" may be 20 cm, a value corresponding to "medium" may be 40 cm, and a value corresponding to "wide" may be 60 cm.

A parameter (2) "route search—smoothness of route" defines a curvature of a route on which the robot 13 moves. For example, a value corresponding to "straight line" may be a relatively small curvature value (for example, a curvature of 0), a value corresponding to "smooth" may be a relatively large curvature value, and a value corresponding to "medium" may be an intermediate curvature value between "straight line" and "smooth." A route for the robot 13 to move to a goal is determined according to the parameters (1) and (2).

A parameter (3) "route search—stopover (person)" defines a frequency of reaction to a person in a case in which the robot 13 detects this person on the movement route. The reaction may be stopping in a vicinity of a detection target, may be moving around the detection target, may be imaging the detection target by the cameras 24, or may be a combination thereof. For example, a value corresponding to "none" may be a frequency of 0 (no stopover), a value corresponding to "frequent" may be a frequency of 50%, and a value corresponding to "medium" may be a frequency of 25%.

A parameter (4) "route search—stopover (thing)" defines a frequency of reaction to a thing in a case in which the robot 13 detects this thing on the movement route. Examples of the reaction are similar to those of a person. For example, a value corresponding to "none" may be a frequency of 0 (no stopover), a value corresponding to "frequent" may be a frequency of 50%, and a value corresponding to "medium" may be a frequency of 25%. The movement route of the robot 13 is updated according to the parameters (3) and (4), in other words, a new movement route is determined including a stopover.

A parameter (5) "route search—goal position (person)" defines a prioritized goal position when the route is set, in other words, defines a distance to a person set as a goal position by priority from the robot 13. For example, a value corresponding to "near" may be a relatively short distance (for example, less than 3 meters), a value corresponding to "far" may be a relatively long distance (for example, 6 meters or more), and a value corresponding to "medium" may be an intermediate distance (for example, 3 meters or longer and shorter than 6 meters).

A parameter (6) "speed—movement speed change (acceleration)" defines an acceleration when the robot 13 moves. For example, a value corresponding to "large" may be a relatively high acceleration, a value corresponding to "small" may be a relatively low acceleration, and a value corresponding to "medium" may be an intermediate acceleration between "large" and "small." Moreover, a value corresponding to "large (only for person)" may be a relatively high acceleration in a case in which the goal is a person, and may be a relatively low acceleration in a case in which the goal is other than a person.

A parameter (7) "speed—normal movement speed" defines a speed (for example, the highest speed) when the robot 13 moves. For example, a value corresponding to "fast" may be a relatively high speed, a value corresponding to "slow" may be a relatively low speed, and a value corresponding to "medium" may be an intermediate speed between "fast" and "slow."

A parameter (8) "speed—head swing speed" defines a speed of head swing (that is, a turn speed of the head drive unit 22) of the robot 13. For example, a value corresponding to "fast" may be a relatively high speed, a value corresponding to "slow" may be a relatively low speed, and a value corresponding to "medium" may be an intermediate speed between "fast" and "slow."

A parameter (9) "range of target of interest—for person" defines whether a range for the robot 13 to detect a person around is wide or narrow. For example, a value corresponding to "wide" may be a relatively wide range (for example, a range having a radius of 4 meters), and a value corresponding to "narrow" may be a relatively narrow range (for example, a range having a radius of 2 meters).

A parameter (10) "range of target of interest—for obstacle" defines whether a range for the robot 13 to detect a thing other than a person around is wide or narrow. For example, a value corresponding to "wide" may be a relatively wide range (for example, a range having a radius of 4 meters), and a value corresponding to "narrow" may be a relatively narrow range (for example, a range having a radius of 2 meters).

A parameter (11) "range of target of interest—person/thing priority" defines a priority between the detection of a person around and the detection of a thing around. For example, a value corresponding to "person=thing" may be a value indicating that a thing and a person around are detected at the same priority. A value corresponding to "person>thing" may be a value indicating that a person around is detected by priority over a thing. "Person<thing" may be assigned, as the parameter (11), to a character to which an unsociable characteristic is assigned, which is not illustrated in FIG. 5. A value corresponding to "person<thing" may be a value indicating that a thing around is detected by priority over a person.

The character data stored in the character data storage unit 34 further includes an image of each character. Moreover, the plurality of characters which the user can select include a character (user avatar) representing the user himself or herself and a character (friend avatar) representing the friend. The character data regarding each of the character representing the user himself or herself and the character representing the friend includes information required for a remote operation for the robot 13, in addition to the image of each character. The information required for the remote operation for the robot 13 may include, for example, identification information regarding the processing device 128 (HMD 100) serving as the transmission destination of the images and the sound collected by the robot 13 and also serving as a transmission source of the operation information for the robot 13 and information required for the communication with this processing device 128 (HMD 100).

With reference back to FIG. 4, in the embodiments, an application program (hereinafter referred to as an "entertainment application") in which a plurality of modules corresponding to the operation reception unit 36, the application control unit 38, the display content generation unit 40, the display control unit 42, and the character data transmission unit 44 are implemented is installed in a storage of the user terminal 11. The entertainment application may be stored in a recording medium, and may be installed in the user terminal 11 via this recording medium. As another example, the entertainment application may be downloaded from a server via a network and may be installed in the user terminal 11. A CPU of the user terminal 11 reads out the entertainment application into a main memory to execute the entertainment application, to thereby attain the functions of the plurality of function blocks described above.

The operation reception unit 36 receives an operation input by the user on the display unit 30 (touch panel). The operation reception unit 36 notifies the application control unit 38 of information relating to the received operation. The application control unit 38 controls an operation of the entertainment application according to the user operation received by the operation reception unit 36.

The display content generation unit 40 generates contents (images and the like) which the display unit 30 displays. The display control unit 42 displays, on the display unit 30, the contents (images and the like) generated by the display content generation unit 40. For example, the display content generation unit 40 generates contents (referred to as a "character selection screen" in the first embodiment) which allow the user to select any one character of a plurality of characters for which personalities different from one another are defined. The display control unit 42 displays the character selection screen on the display unit 30.

The character data transmission unit 44 reads out data regarding the character selected on the character selection screen (hereinafter also referred to as "selected character data") from the character data storage unit 34 and transmits the selected character data to the control device 14.

Figure 6:
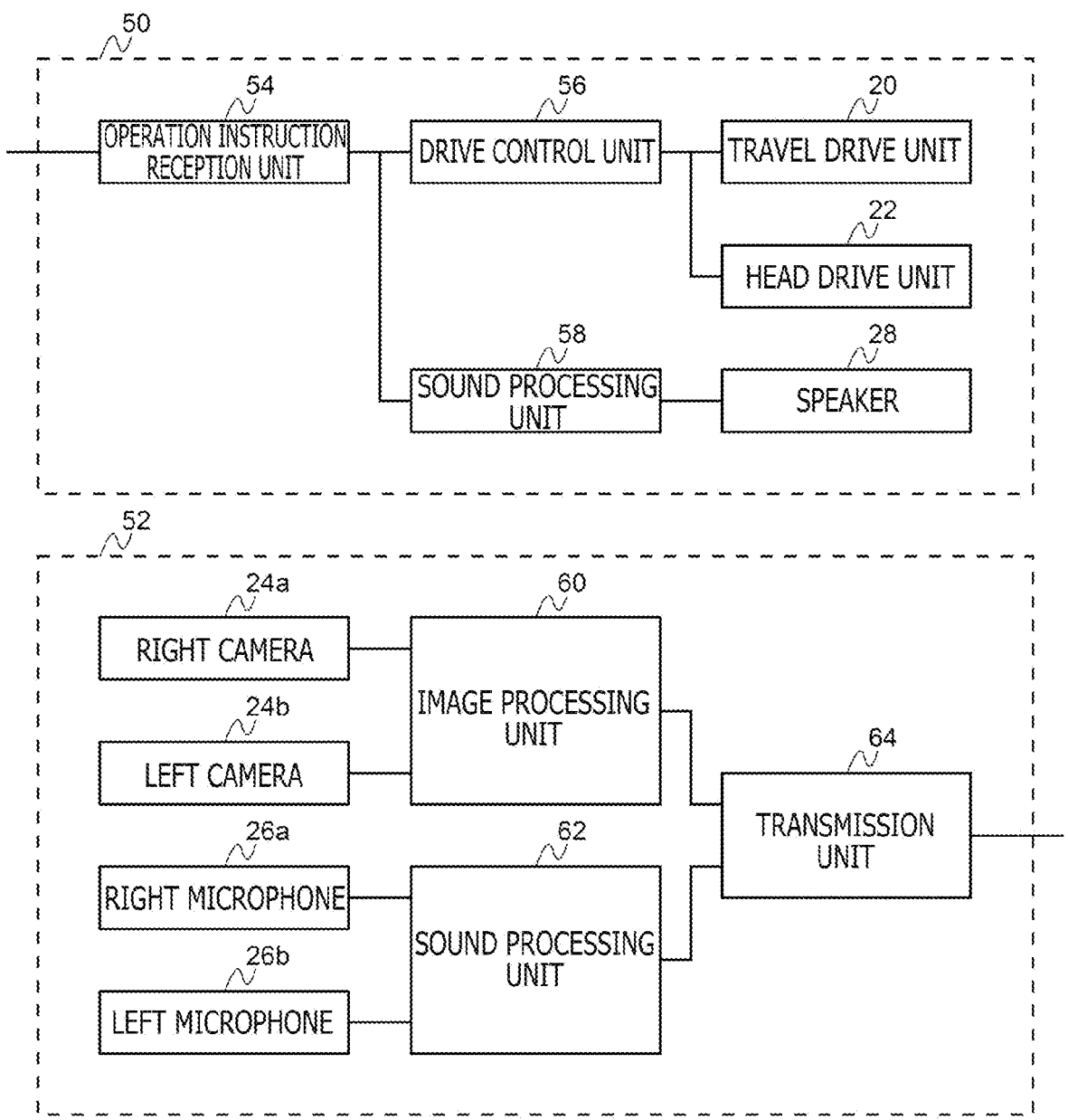
FIG. 6 is a block diagram for illustrating function blocks of a robot.

FIG. 6 is a block diagram for illustrating function blocks of the robot 13. The robot 13 includes an input system 50 which receives input from the outside and processes the input and an output system 52 which processes output to the outside. The input system 50 includes an operation instruction reception unit 54, a drive control unit 56, and a sound processing unit 58. The output system 52 includes an image processing unit 60, a sound processing unit 62, and a transmission unit 64.

The operation instruction reception unit 54 receives an operation instruction transmitted from the control device 14. The operation instruction includes at least one of a drive instruction for indicating operation modes of the travel drive unit 20 and the head drive unit 22 and the sound data to be output from the speaker 28.

The drive control unit 56 controls the operations of the travel drive unit 20 and the head drive unit 22 in accordance with the drive instruction included in the operation instruction. In other words, the drive control unit 56 causes the travel drive unit 20 and the head drive unit 22 to operate in the modes (for example, a speed, a distance, an angle, and the like) indicated by the drive instruction. The sound processing unit 58 carries out sound processing based on the sound data included in the operation instruction, and causes the speaker 28 to output sound based on the sound data.

Each of the right camera 24a and the left camera 24b is oriented to a direction controlled by the head drive unit 22 and images an inside of an angle of view each thereof. The right camera 24a and the left camera 24b may be arranged apart from each other to attain an average gap between both of the eyes of an adult. Image data for the right eye imaged by the right camera 24a and image data for the left eye imaged by the left camera 24b may be supplied to the HMD 100 and may be displayed on a right half and a left half of the display panel 102, respectively. These images form parallax images viewed by the right eye and the left eye, and stereoscopy of the image can be achieved by causing the regions obtained by dividing the display panel 102 into the two parts to display these images, respectively. Note that the user views the display panel 102 through the optical lenses, and hence the image processing unit 60 may generate, in advance, image data which corrects optical distortion caused by the lenses and may supply this image data to the HMD 100. In a case in which the image data for the right eye and the image data for the left eye are not particularly distinguished from each other, these pieces of image data are generally referred to as "imaged data."

The right microphone 26a and the left microphone 26b convert sound around the robot 13 into electric signals to generate the sound signals. The sound processing unit 62 generates the sound data obtained by encoding the sound signals output from the right microphone 26a and the left microphone 26b. The transmission unit 64 transmits, to the control device 14, the imaged data supplied from the image processing unit 60 and the sound data supplied from the sound processing unit 62.

Figure 7:
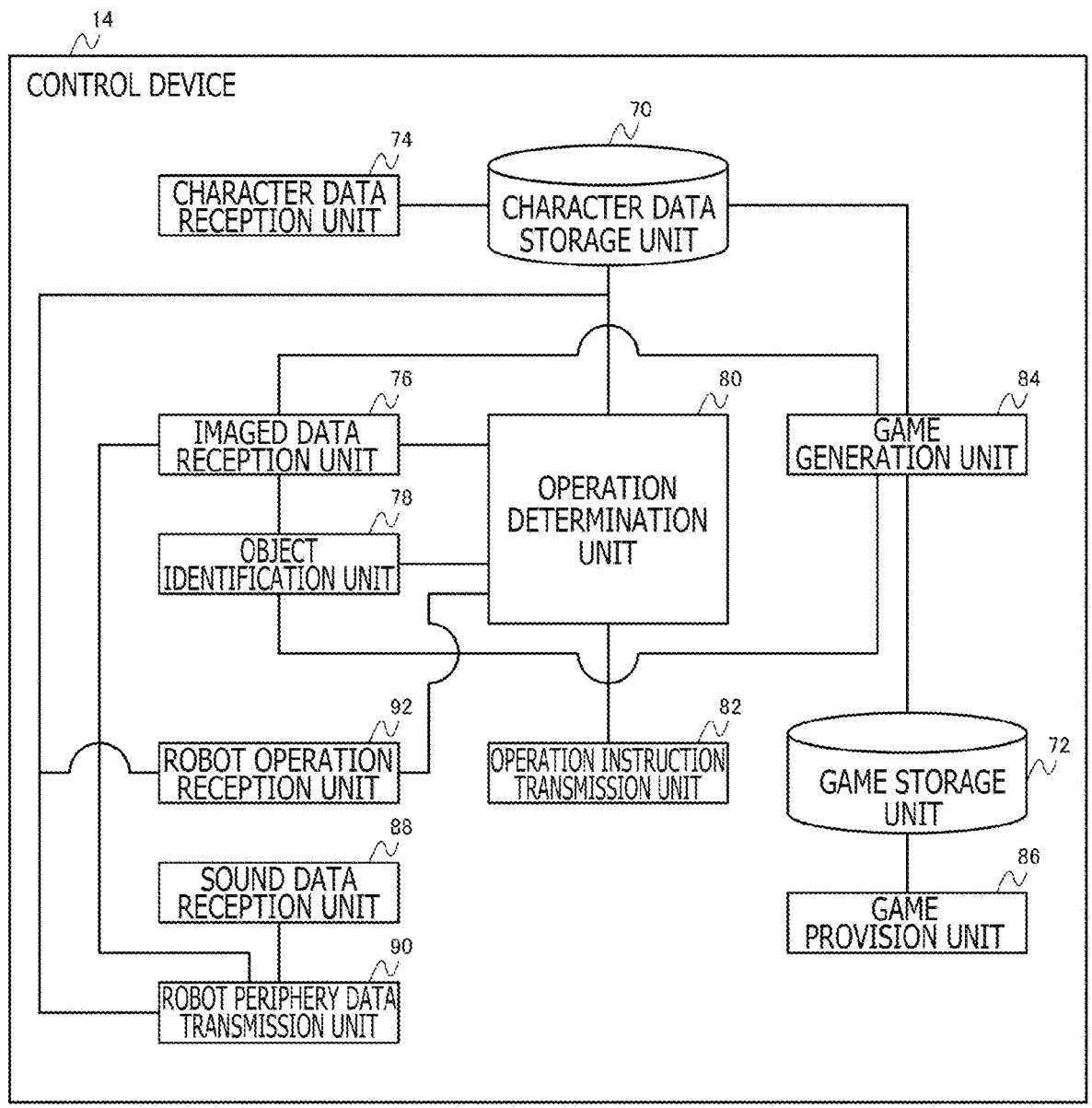
FIG. 7 is a block diagram for illustrating function blocks of a control device.

FIG. 7 is a block diagram for illustrating function blocks of the control device 14. The control device 14 includes a character data storage unit 70, a game storage unit 72, a character data reception unit 74, an imaged data reception unit 76, an object identification unit 78, an operation determination unit 80, an operation instruction transmission unit 82, a game generation unit 84, a game provision unit 86, a sound data reception unit 88, a robot periphery data transmission unit 90, and a robot operation reception unit 92.

The character data storage unit 70 stores the selected character data (the image, the various types of parameters, and the like) which is the data regarding the character selected by the user and is transmitted from the user terminal 11. The game storage unit 72 stores data (hereinafter also referred to as "game data") regarding a game application generated by the game generation unit 84 described later.

In the embodiments, an application program in which a plurality of modules corresponding to the character data reception unit 74, the imaged data reception unit 76, the object identification unit 78, the operation determination unit 80, the operation instruction transmission unit 82, the game generation unit 84, the game provision unit 86, the sound data reception unit 88, the robot periphery data transmission unit 90, and the robot operation reception unit 92 are implemented is installed in a storage of the control device 14 via a recording medium or a network. A CPU of the control device 14 reads out the application program described above into a main memory to execute the application program, to thereby exert functions of the plurality of function blocks described above.

The character data reception unit 74 receives the selected character data which is the data regarding the character selected by the user and is transmitted from the user terminal 11. The character data reception unit 74 stores the received selected character data in the game storage unit 72.

The imaged data reception unit 76 receives the imaged data transmitted from the robot 13. That is, the imaged data reception unit 76 acquires the image data in which the objects in the real world imaged by the camera 24 of the robot 13 appear.

The object identification unit 78 recognizes, by a publicly-known method, what the object imaged by the camera 24 of the robot 13 is. In other words, the object identification unit 78 identifies a type of the object appearing in the imaged data transmitted from the robot 13. For example, the object identification unit 78 identifies whether the object appearing in the imaged data is a person or a thing other than a person. The object identification unit 78 may use the template matching to identify the type of the object appearing in the imaged data, on the basis of a shape, a pattern, a color, and the like of this object.

The operation determination unit 80 determines the operation modes of the robot 13 on the basis of the parameters corresponding to the personality of the character selected on the user terminal 11. Specifically, the operation determination unit 80 determines the operation modes of the robot 13 on the basis of an image of the object appearing in the imaged data transmitted from the robot 13, the type of this object identified by the object identification unit 78, and the character data stored in the character data storage unit 70. The operation modes of the robot 13 include the operation mode (a movement direction, a movement speed, and the like) of the travel drive unit 20 and the operation mode (a turn angle, a turn speed, and the like) of the head drive unit 22.

The operation instruction transmission unit 82 transmits, to the robot 13, the operation instruction (drive instruction) indicating the operation modes of the robot 13 determined by the operation determination unit 80, to thereby operate the robot 13 in the modes determined by the operation determination unit 80.

The game generation unit 84 generates a game displaying an AR space (AR image) including both the objects in the real world imaged by the cameras 24 of the robot 13, that is, the objects in the real world appearing in the imaged data transmitted from the robot 13, and virtual objects corresponding to these objects in the real world. The game generation unit 84 stores generated game data in the game storage unit 72.

The game provision unit 86 provides, to an external device, the game data generated by the game generation unit 84 and then stored in the game storage unit 72. For example, the game generation unit 84 may display an AR image for the right eye and an AR image for the left eye having a mutual parallax therebetween, to thereby generate a game having contents of exploration in the AR space. The game provision unit 86 may provide this game data to the processing device 128, to thereby cause the HMD 100 to display a three-dimensional (3D) game having the contents of the exploration in the AR space.

The sound data reception unit 88 receives the sound data transmitted from the robot 13. The robot periphery data transmission unit 90 transmits, to the processing device 128, robot periphery data including at least one of the imaged data acquired by the imaged data reception unit 76 and the sound data acquired by the sound data reception unit 88. As a result, the image in which the periphery of the robot 13 imaged by the robot 13 appears, and the sound around the robot 13 collected by the robot 13 is reproduced in the HMD 100.

The robot operation reception unit 92 receives a remote operation carried out by the user or the friend and directed to the robot 13. Specifically, the robot operation reception unit 92 receives the user operation information transmitted from the processing device 128a or receives the friend operation information transmitted from the processing device 128b.

The operation determination unit 80 generates, in a case in which the user operation information (or the friend operation information) is received, the operation instruction including the drive instruction for causing the robot 13 to carry out an operation corresponding to the operation indicated by the user operation information (or the friend operation information). Moreover, the operation determination unit 80 generates the operation instruction including the sound data included in the user operation information (or the friend operation information).

A description is now given of an operation of the entertainment system 10 according to the first embodiment having the configuration described above.

The user starts the entertainment application on the user terminal 11. The display content generation unit 40 of the user terminal 11 generates data regarding the character selection screen, and the display control unit 42 causes the display unit 30 to display the character selection screen.

Figure 8:
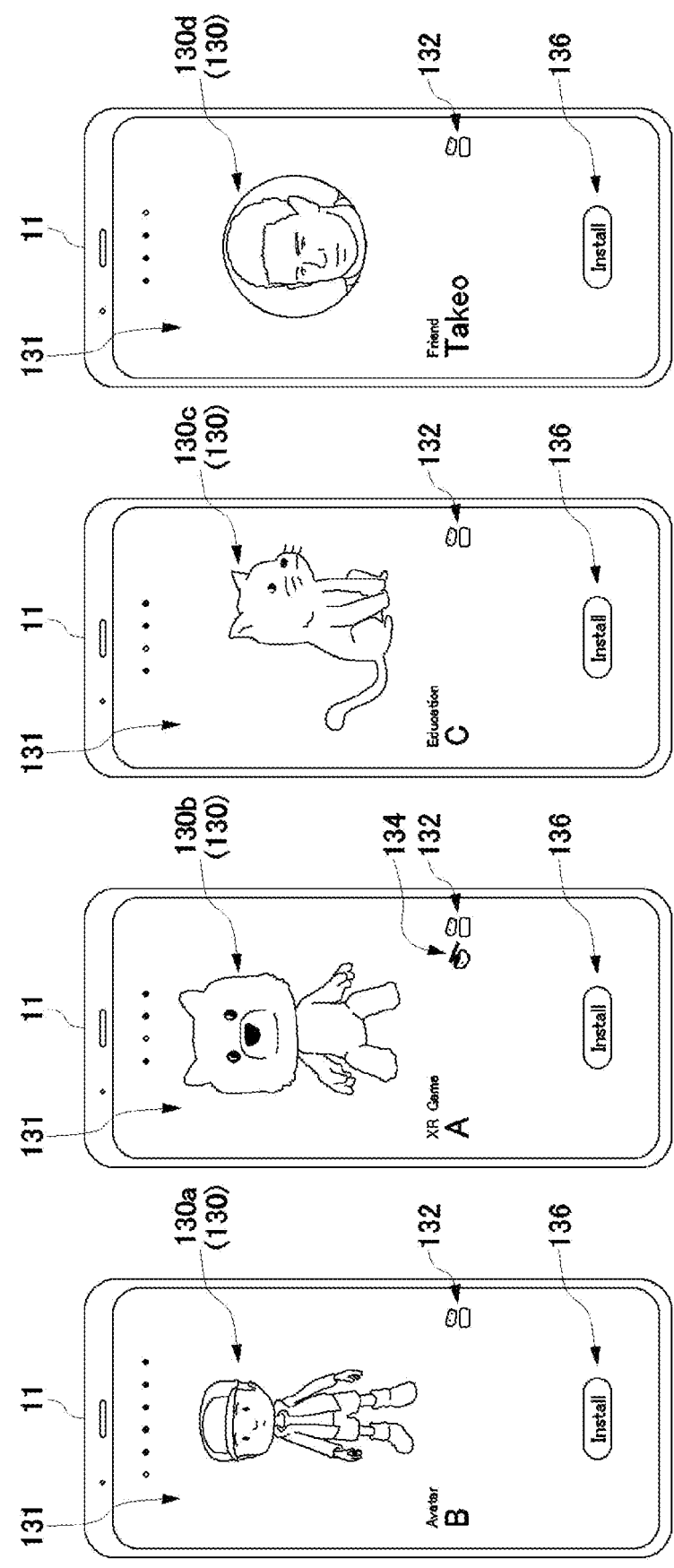
FIG. 8 is a view for illustrating examples of character selection screens.

FIG. 8 illustrates examples of the character selection screens. A character selection screen 131 is configured to display the plurality of characters having personalities different from one another (that is, characters of selection candidates), in response to a swipe operation or the like. In FIG. 8, a character 130a (the character B of FIG. 5), a character 130b (the character A of FIG. 5), a character 130c (the character C of FIG. 5), and a character 130d (Takeo) representing the friend are included as the plurality of characters. In a case in which the character 130a, the character 130b, the character 130c, and the character 130d are not particularly distinguished from one another, these characters are referred to as "characters 130."

An icon 132 indicates that the robot 13 is a character which autonomously operates or that the robot 13 is a character which is operated by the remote operation. Moreover, an icon 134 indicates that the robot 13 is a character which automatically generates a game.

When a pressing-down operation on an install button 136 is input on the character selection screen 131 on which a specific character is displayed, the application control unit 38 of the user terminal 11 activates the camera 32. The display content generation unit 40 of the user terminal 11 determines, as display contents, images which are captured by the camera 32 and in which objects around the user terminal 11 appear, and the display control unit 42 causes the display unit 30 to display these images.

The user places the robot 13 in an angle of view of the camera 32. The display content generation unit 40 detects, in a case in which the robot 13 is imaged by the camera 32, that is, in a case in which the robot 13 appears in the image captured by the camera 32, this state by publicly-known object recognition processing (template matching or the like). In a case in which the display content generation unit 40 detects that the robot 13 is imaged by the camera 32, the display content generation unit 40 generates the AR image displaying, together with the image of the robot 13, an image of the character 130 selected on the character selection screen 131 by the user. The display control unit 42 causes the display unit 30 to display the AR image described above.

Figure 9:
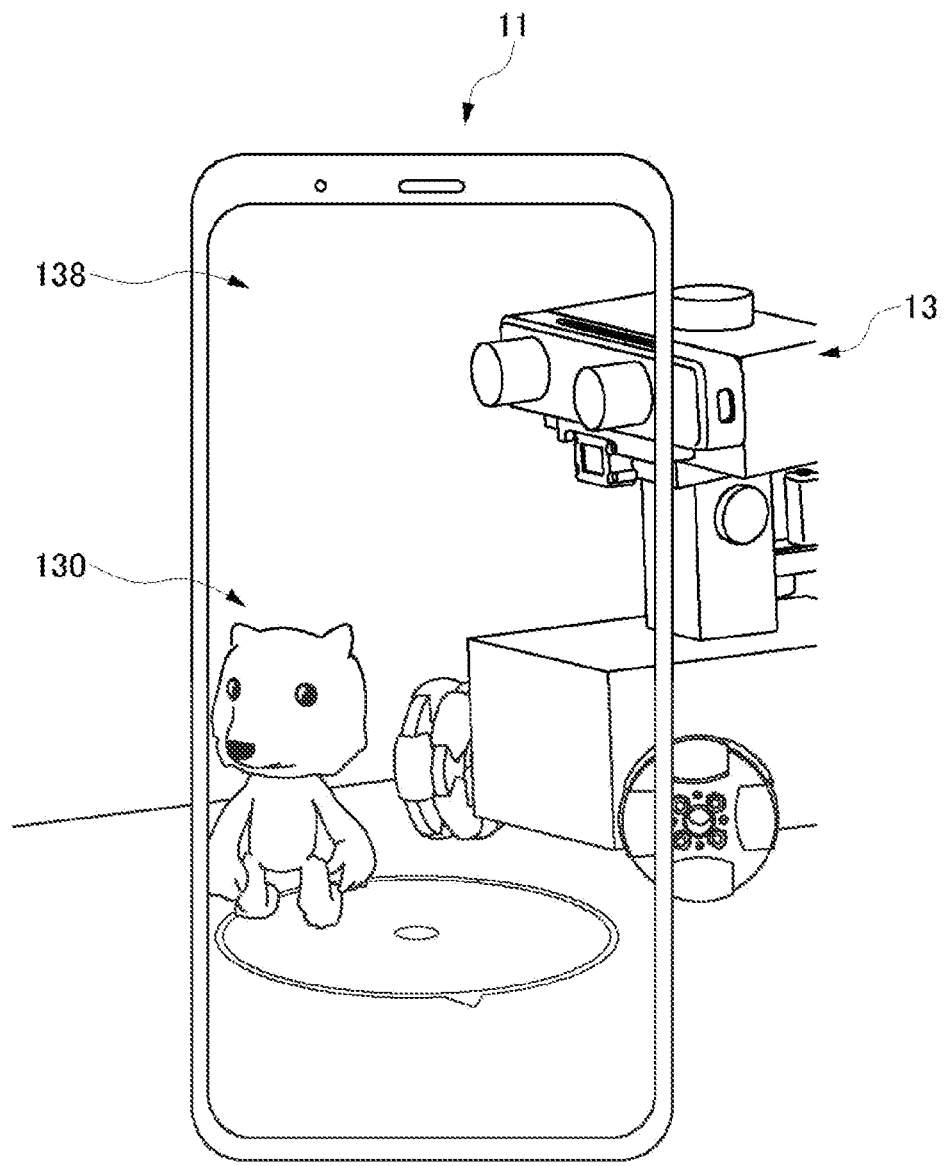
FIG. 9 is a view for illustrating an example of an augmented reality (AR) image.

After that, the display content generation unit 40 generates an AR image including contents in which the character 130 selected by the user possess the robot 13. FIG. 9 illustrates an example of the AR image. An AR image 138 may be a motion image having such contents that the character 130 enters, from the outside of the robot 13, the inside of the robot 13. Moreover, the AR image 138 may be an image which further displays an object which associates the robot 13 and the character 130 with each other. As described above, it is possible to, by causing the AR image including such contents that the character 130 selected by the user possesses the robot 13 to be displayed, indicate to the user that the robot 13 carries out an operation corresponding to the personality of this character 130.

The character data transmission unit 44 of the user terminal 11 transmits, to the control device 14, the character data regarding the character 130 selected by the user, in synchronous with the display of the AR image 138 (that is, the display of such contents that the character 130 selected by the user possesses the robot 13).

The character data reception unit 74 of the control device 14 receives the character data transmitted from the user terminal 11 and stores the character data in the character data storage unit 70. The operation determination unit 80 of the control device 14 determines the activation of the cameras 24 of the robot 13, and the operation instruction transmission unit 82 transmits, to the robot 13, an operation instruction which indicates the activation of the cameras 24. The robot 13 activates the cameras 24, and the transmission unit 64 of the robot 13 transmits the image data (imaged data) captured by the cameras 24 to the control device 14.

The imaged data reception unit 76 of the control device 14 receives the imaged data transmitted from the robot 13. The object identification unit 78 of the control device 14 identifies a type (for example, a person or a thing) of each of the objects which appear in the images of the imaged data and which are present around the robot 13. The operation determination unit 80 of the control device 14 determines the operation modes of the robot 13 on the basis of attributes (for example, a position, a shape, a pattern, a color, a type) of each of the objects which are present around the robot 13 and the parameters (that is, the character data stored in the character data storage unit 70) corresponding to a personality of the character selected by the user.

A description is now given of a first example relating to determination processing for the operation modes of the robot 13. The operation determination unit 80 determines a mode relating to the route search of the robot 13 on the basis of the parameters defined in advance as the personality of the character selected on the user terminal 11. For example, the operation determination unit 80 determines a goal position (for example, a position close to a person) according to the parameter (5) "route search—goal position (person)" of FIG. 5. Moreover, the operation determination unit 80 determines a movement mode (movement route) to the goal according to the parameter (1) "route search—gap to obstacle, the parameter (2) "route search—smoothness of route," the parameter (3) "route search—stopover (person)," and the parameter (4) "route search—stopover (thing)" of FIG. 5.

A description is now given of a second example relating to the determination processing for the operation modes of the robot 13. The operation determination unit 80 determines a mode relating to the operation speed of the robot 13 on the basis of the parameters defined in advance as the personality of the character selected on the user terminal 11. For example, the operation determination unit 80 determines a movement speed (for example, a rotation speed of the travel drive unit 20) of the robot 13 according to the parameter (7) "speed—normal movement speed" of FIG. 5. Moreover, the operation determination unit 80 determines an acceleration (for example, an acceleration of the rotation of the travel drive unit 20) until the movement speed described above is reached according to the parameter (6) "speed—movement speed change (acceleration)" of FIG. 5. Further, the operation determination unit 80 determines a turn speed of the head drive unit 22 according to the parameter (8) "speed—head swing speed" of FIG. 5.

A description is now given of a third example relating to the determination processing for the operation modes of the robot 13. The operation determination unit 80 determines the modes relating to an operation of determining a target of interest of the robot 13 among the objects identified by the object identification unit 78, on the basis of the parameters defined in advance as the personality of the character selected on the user terminal 11. For example, the operation determination unit 80 sets, as candidates for the target of interest, persons within a range defined by the parameter (9) "range of target of interest—for person" of FIG. 5. Moreover, the operation determination unit 80 sets, as the candidates for the target of interest, things within a range defined by the parameter (10) "range of target of interest—for obstacle" of FIG. 5. Further, the operation determination unit 80 determines a target of interest among the persons and the things of the candidates for the target of interest according to the parameter (11) "range of target of interest—person/thing priority" of FIG. 5.

In a case in which the operation determination unit 80 determines a target of interest, the operation determination unit 80 may determine to cause the robot 13 to carry out an operation of interest (for example, the imaging by the cameras 24) directed to the person or the thing of the target of interest.

The operation determination unit 80 generates the operation instruction which indicates the determined operation modes. The operation instruction transmission unit 82 of the control device 14 transmits the operation instruction generated by the operation determination unit 80 to the robot 13. The drive control unit 56 of the robot 13 controls operations of the travel drive unit 20 and the head drive unit 22 in accordance with the operation instruction. As a result of the processing described above, the robot 13 autonomously searches the periphery in the modes corresponding to the personality (each parameter of the character data) of the character selected by the user.

As described above, with the entertainment system 10 according to the first embodiment, the robot 13 can be caused to carry out the operation corresponding to the personality of the character which is of the plurality of characters having the personalities different from one another and which the user desires, and hence user experience achieved by the robot 13 (entertainment robot) can be improved.

Note that, in a case in which, after selection of a first character by the user, a second character (different from the first character) is newly selected by the user, the control device 14 carries out control of the operation of the robot 13 on the basis of the character data regarding the second character, in place of the control of the operation of the robot 13 on the basis of the character data regarding the first character. That is, the control device 14 dynamically switches the parameters for controlling the operation of the robot 13, according to the change in character selection by the user. As a result, the user can switch the operation mode of the single robot 13 as desired.

A description is now given of an operation in a case in which the character 130b (character A) to which the icon 134 is added is selected on the character selection screen 131 of FIG. 8. In this case, the robot 13 images the objects in the periphery by the cameras 24 at the predetermined cycle while autonomously searching the periphery in the modes corresponding to the personality assigned to the character A. The transmission unit 64 of the robot 13 transmits the imaged data captured by the cameras 24, to the control device 14 at a predetermined cycle.

The imaged data reception unit 76 of the control device 14 receives the imaged data transmitted from the robot 13, and the object identification unit 78 identifies the types of the objects appearing in the imaged data, in other words, the objects in the real world imaged by the cameras 24 of the robot 13. The game generation unit 84 generates the game displaying the AR space including both the objects (hereinafter also referred to as "real objects") in the real world imaged by the cameras 24 of the robot 13 and the virtual objects corresponding to these objects in the real world.

Figure 10:
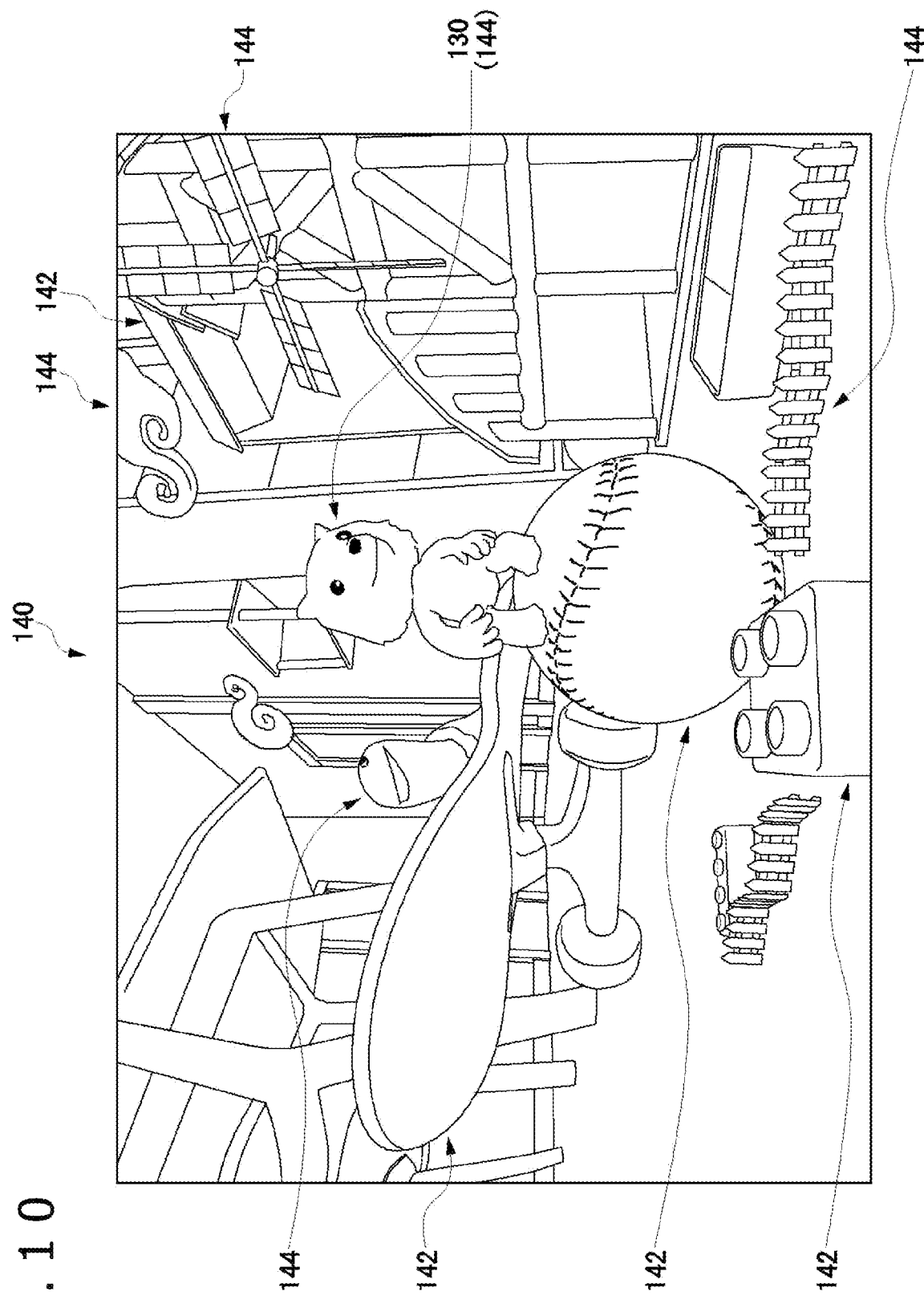
FIG. 10 is a view for illustrating a screen example of a game generated by a game generation unit.

FIG. 10 illustrates an example of a game image generated by the game generation unit 84. In a game image 140, as real objects 142, a skateboard, shelves, blocks, and a ball are arranged. They are things actually existing in a room in which the robot 13 is placed. Moreover, the game image 140 includes, as virtual objects 144, a buddy character, a windmill, fences, clouds, and the character 130 (the character selected by the user). This game may be, for example, a game in which the character 130 searches the AR space in which the real objects 142 and the virtual objects 144 are mixed.

The game generation unit 84 stores data representing the correspondence between a freely-selected combination of the shape, the pattern, the color, the type, and the like of the real object 142 appearing in the imaged data and the virtual object 144. The data representing the correspondence is data which, for example, associates (1) the skateboard as the real object 142 and the buddy character as the virtual object 144 with each other, associates (2) the shelf as the real object 142 and the windmill as the virtual object 144 with each other, and associates (3) the block as the real object 142 and the fences as the virtual object 144 with each other. The game generation unit 84 arranges, at a vicinity position of a certain real object 142, a virtual object 144 corresponding to this real object 142.

The game generation unit 84 stores the generated game data in the game storage unit 72. The game provision unit 86 transmits, in response to a request of an external device, the game data stored in the game storage unit 72 to the external device which is the request source. With the entertainment system 10 according to the first embodiment, there can be provided, to the user, the game for displaying the AR space in which, together with the real objects imaged from the view-point (the positions of the cameras 24) of the robot 13, the virtual objects corresponding to these real objects are arranged, and hence novel user experience through use of the robot 13 can be provided.

A description is now given of an operation in a case in which the character 130*d* (friend avatar) is selected on the character selection screen 131 of FIG. 8. In this case, the operation determination unit 80 determines the operation modes of the robot 13 on the basis of the friend operation information transmitted from the device of the friend.

Specifically, in a case in which the character 130*d* (friend avatar) is selected on the character selection screen 131, as data regarding this character, data required for the communication with the processing device 128*b* is stored in the character data storage unit 70 of the control device 14. The control device 14 (the robot operation reception unit 92 and the robot periphery data transmission unit 90) uses data stored in the character data storage unit 70, to establish connection with the processing device 128*b*.

The imaged data reception unit 76 of the control device 14 receives the imaged data (the image for the right eye and the image for the left eye) transmitted from the robot 13 at the predetermined cycle. The sound data reception unit 88 receives the sound data transmitted from the robot 13 at the predetermined cycle. The robot periphery data transmission unit 90 transmits, to the processing device 128*b*, the imaged data and the sound data transmitted from the robot 13.

The processing device 128*b* transfers, to the HMD 100*b*, the imaged data and the sound data transmitted from the control device 14. The HMD 100*b* causes the display panel 102 (the display panel for the right eye and the display panel for the left eye) to display the imaged data (the image for the right eye and the image for the left eye) transmitted from the processing device 128*b*. The friend can see the state around the robot 13 in real time and can hear the sound around the robot 13 in real time.

The friend inputs, to the processing device 128*b*, an operation (an operation for indicating the drive mode of the travel drive unit 20 and the drive mode of the head drive unit 22) directed to the robot 13. The processing device 128*b* transmits, to the control device 14, friend operation information which represents the operation directed to the robot 13 and input by the friend. The friend operation information includes sound data which is collected by the microphone 106 of the HMD 100*b* and which represents the voice uttered by the friend.

The robot operation reception unit 92 of the control device 14 receives the friend operation information transmitted from the processing device 128*b*. The operation determination unit 80 generates the operation instruction for indicating the operation contents (the drive mode of the travel drive unit 20 and the drive mode of the head drive unit 22) represented by the friend operation information. The operation instruction transmission unit 82 transmits this operation instruction to the robot 13. Note that the friend operation information may include the motion of the head portion of the friend wearing the HMD 100*b* and that the operation determination unit 80 may determine the drive mode of the head drive unit 22 of the robot 13 in such a manner as to be consistent with the motion of the head portion of the friend.

As a result of the processing described above, the operation input by the friend and directed to the robot 13 is reflected in real time to the motion of the robot 13. Moreover, the operation determination unit 80 generates the operation instruction including the sound data included in the friend operation information. The operation instruction transmission unit 82 transmits this operation instruction to the robot 13. As a result, the voice uttered by the friend is output in real time from the speaker 28 of the robot 13.

As described above, with the entertainment system 10 according to the first embodiment, the robot 13 operates in response to the remote operation by the friend, and reproduces the voice of the friend. Meanwhile, the friend can view and hear the image and the sound, respectively, around the robot 13 in real time via the HMD 100*b*. As a result, a person around the robot 13 and the friend can communicate with each other in real time.

Note that a character representing the user himself or herself (user avatar) may be included in the characters selectable on the character selection screen 131, which is not illustrated in FIG. 8. In a case in which the user avatar is selected on the character selection screen 131, the operation determination unit 80 determines the operation modes of the robot 13 on the basis of the user operation information transmitted from the device of the user. A specific processing in the case in which the user avatar is selected on the character selection screen 131 is similar to the processing in the case in which the friend avatar is selected on the character selection screen 131, and is processing obtained by replacing the HMD 100*b* by the HMD 100*a* and replacing the processing device 128*b* by the processing device 128*a*.

Second Embodiment

A description is now mainly given of a configuration of a second embodiment different from that of the first embodiment, and a description of a common configuration is appropriately be omitted. It is obvious that the configuration of the second embodiment can freely be combined with configurations of the first embodiment and modification examples.

A description is now given of an overview of the second embodiment. In recent years, there has emerged a technology called tele-existence which uses a robot positioned at a remote location, as an alter ego of a user himself or herself. The robot which is present at the remote location transmits image data and sound data regarding a periphery to the user, and the image data and the sound data are reproduced on the user side, thereby enabling the user to experience a sense of presence at the location of the robot. Moreover, an HMD is used in various fields. It is possible to increase a sense of immersion into the video world by implementing a head tracking function in the HMD, to thereby update a display screen operationally in association with a posture of the head portion of the user.

In the second embodiment, an HMD worn by the user is caused to display an AR image in which objects in the real world appearing in the images captured by the cameras of the robot and virtual objects arranged by the user. The position of the HMD in the height direction possibly changes greatly in a case in which the user stands up, for example. The height direction is, for example, a vertical direction with respect to a floor surface on which the robot and the user move. Meanwhile, the robot is usually configured such that the position of the camera in the height direction does not change beyond a predetermined range. Thus, in a case in which the position of the HMD in the height direction changes, the user viewing the AR image sometimes feels a sense of discomfort, resulting in what is generally called VR sickness of the user.

Thus, the entertainment system according to the second embodiment generates, in a case in which the position of the HMD in the height direction changes, an image (what is generally called a VR image) from which objects in the real world are removed and which presents exterior appearances of virtual objects viewed from new view-points corresponding to the change in the position of the HMD in the height direction, and switches the previous display of the AR image to display of the VR image. That is, in the entertainment system according to the second embodiment, a video see-through function of the HMD is set to ON in a default mode while the video see-through function of the HMD is switched to OFF in the case in which the position of the HMD in the height direction changes.

The configuration of the entertainment system 10 according to the second embodiment is the same as the configuration of the entertainment system 10 according to the first embodiment illustrated in FIG. 1. As described above, the height (eye height) of the attachment positions of the cameras 24 in the robot 13 is 144 mm. The robot 13 is configured such that the positions of the cameras 24 in the height direction do not change beyond the predetermined range. For example, even in a case in which the head drive unit 22 of the robot 13 turns about the pitch axis or the roll axis, the robot 13 is configured such that the change in eye height is some centimeters. Note that the robot 13 may be configured such that the positions of the cameras 24 in the height direction do not change.

Figure 11:
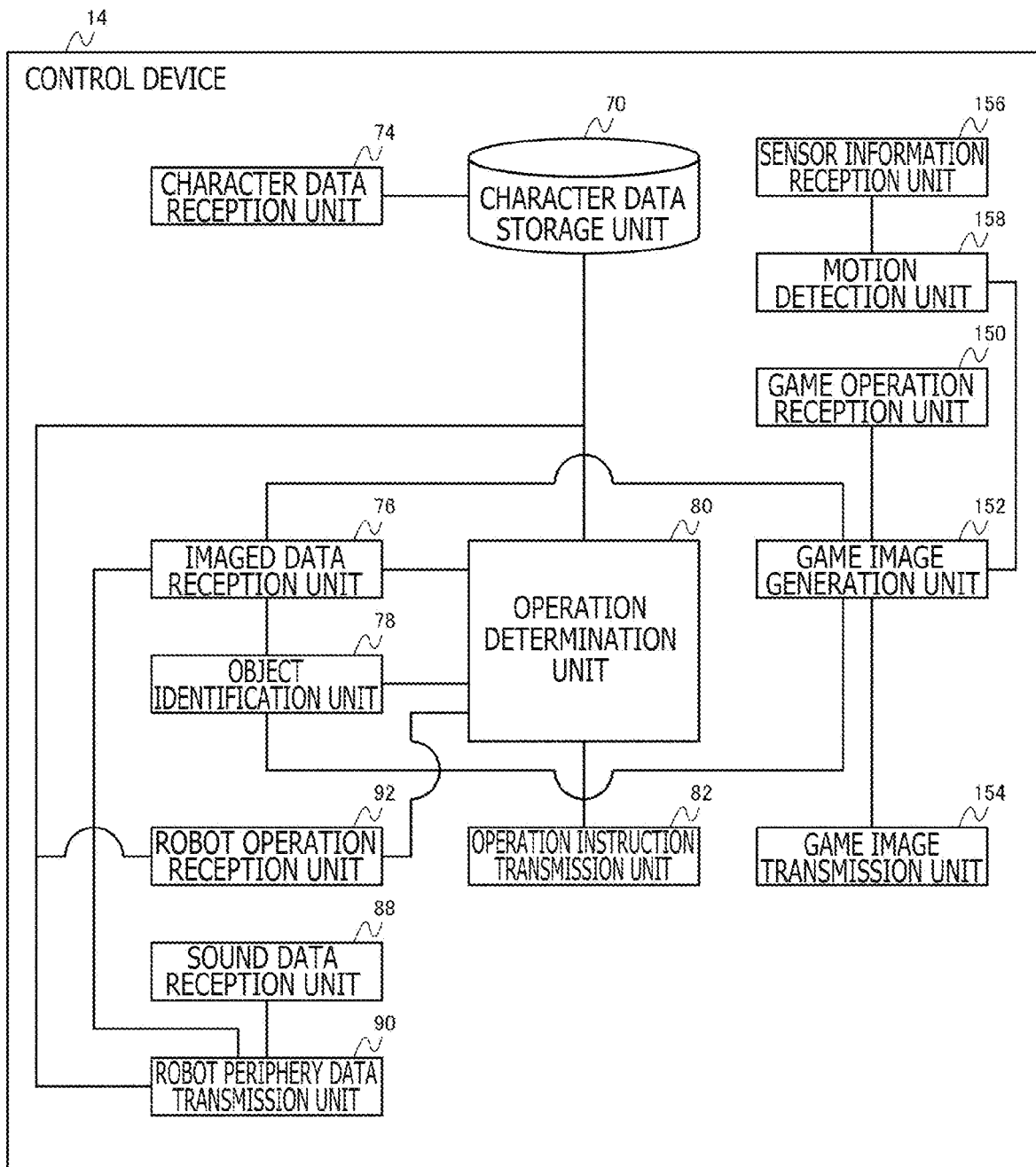
FIG. 11 is a block diagram for illustrating function blocks of the control device according to a second embodiment.

FIG. 11 is a block diagram for illustrating function blocks of the control device 14 according to the second embodiment. The control device 14 according to the second embodiment includes, as the same function blocks as those of the control device 14 according to the first embodiment, the character data storage unit 70, the character data reception unit 74, the imaged data reception unit 76, the object identification unit 78, the operation determination unit 80, the operation instruction transmission unit 82, the sound data reception unit 88, the robot periphery data transmission unit 90, and the robot operation reception unit 92. The control device 14 according to the second embodiment further includes a game operation reception unit 150, a game image generation unit 152, a game image transmission unit 154, a sensor information reception unit 156, and a motion detection unit 158.

An application program in which a plurality of modules corresponding to the character data reception unit 74, the imaged data reception unit 76, the object identification unit 78, the operation determination unit 80, the operation instruction transmission unit 82, the sound data reception unit 88, the robot periphery data transmission unit 90, the robot operation reception unit 92, the game operation reception unit 150, the game image generation unit 152, the game image transmission unit 154, the sensor information reception unit 156, and the motion detection unit 158 are implemented may be installed in the control device 14 via a recording medium or a network. The CPU of the control device 14 reads out the application program described above into the main memory to execute the application program, to thereby exert functions of the plurality of function blocks described above.

The game operation reception unit 150 receives, from the processing device 128a, the user operation information which is input to the processing device 128a and which indicates the operation of the user.

The game image generation unit 152 generates game images on the basis of the imaged data captured by the robot 13 and acquired by the imaged data reception unit 76 and the user operation information acquired by the game operation reception unit 150. The game images include a game image for the right eye and a game image for the left eye having a mutual parallax therebetween.

In the second embodiment, the game image transmission unit 154 of the control device 14, the processing device 128a, and the control unit 120 of the HMD 100a cooperate with one another to function as a display control unit which causes the display panel 102 of the HMD 100a to display the game images. Specifically, the game image transmission unit 154 transmits data regarding the game images (the game image for the right eye and the game image for the left eye) generated by the game image generation unit 152 to the processing device 128a. The processing device 128a passes the game images to the HMD 100a, and the HMD 100a causes the display panel for the right eye to display the game image for the right eye, and causes the display panel for the left eye to display the game image for the left eye. As a result, the user can stereoscopically view the contents drawn in the game images.

The sensor information reception unit 156 acquires the posture information detected by the posture sensor 124 of the HMD 100a. The motion detection unit 158 uses a publicly-known head tracking technology to detect the posture of the HMD 100a worn on the head portion of the user, on the basis of the posture information acquired by the sensor information reception unit 156.

In the second embodiment, the motion detection unit 158 detects the change (change amount) in the position of the HMD 100a in the height direction. The motion detection unit 158 inputs the change amount of the HMD 100a in the height direction to the game image generation unit 152. The game image generation unit 152 generates the game images reflecting the change amount of the position of the HMD 100a in the height direction.

A description is now given of an operation of the entertainment system 10 according to the second embodiment having the configuration described above.

It is herein assumed that the user avatar is selected from the plurality of characters, the user remotely operates the robot 13, and the video and the sound around the robot 13 are reproduced in the HMD 100a. The user inputs an operation for instructing switching to a game mode to the processing device 128a, and the processing device 128a transmits the user operation information indicating this operation, to the control device 14.

The game image generation unit 152 of the control device 14 generates, when the user operation information which instructs the switching to the game mode is received, first game images in which objects (real objects) in the real world appearing in the imaged data (that is, the images captured by the cameras 24 of the robot 13) acquired by the imaged data reception unit 76 and virtual objects appear. The first game image is a default game image, and is a game image obtained when the video see-through function of the HMD 100a is enabled.

Figure 12:
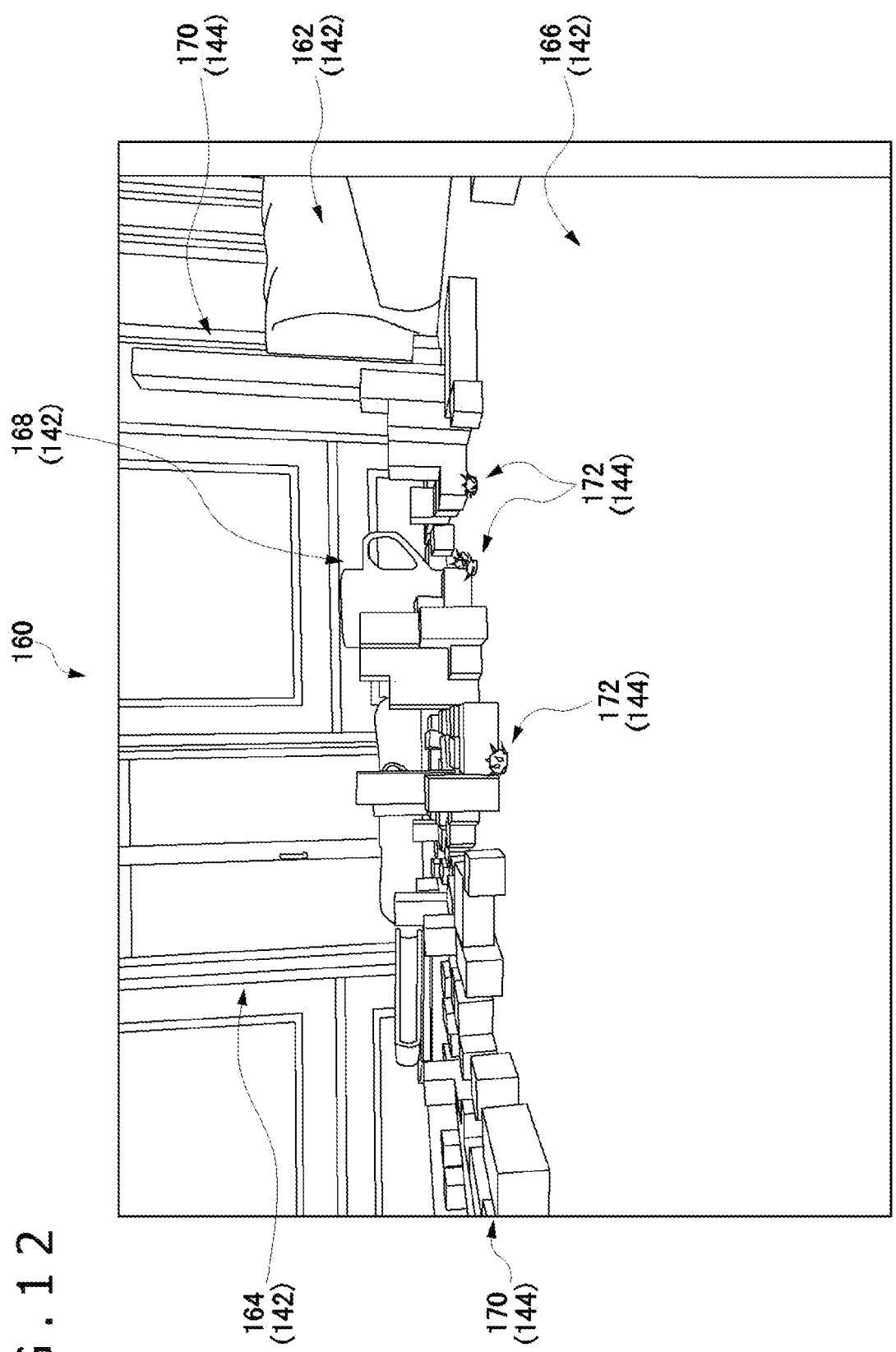
FIG. 12 is a view for illustrating an example of a first game image.

FIG. 12 illustrates an example of the first game image. A first game image 160 of FIG. 12 includes, as the real objects 142, a sofa 162, a door 164, a table 166, and a cup 168. Moreover, the first game image 160 includes, as the virtual objects 144, a plurality of blocks 170 and a plurality of enemy characters 172. The first game image is an AR image obtained by adding the virtual objects 144 to the space of the real world imaged by the cameras 24 of the robot 13.

The user inputs, to the processing device 128*a*, an operation of arranging the virtual object (the block 170 or the enemy character 172) in the space of the real world imaged by the robot 13, and the processing device 128*a* transmits the user operation information indicating the operation described above to the control device 14. The game operation reception unit 150 of the control device 14 receives the user operation information indicating the operation described above.

The game image generation unit 152 of the control device 14 arranges the virtual objects 144 in the space appearing in the imaged data acquired by the imaged data reception unit 76, according to the user operation information indicating the operation described above. The game image generation unit 152 generates the first game images which have the positions of the cameras 24 of the robot 13 as view-points and which present exterior appearances of the virtual object 144, in other words, generates the first game images presenting exterior appearances of the virtual objects 144 viewed from the eye height of the robot 13. The game image transmission unit 154 of the control device 14 transmits the first game images to the processing device 128*a*, to thereby cause the HMD 100*a* to display the first game images.

The sensor information reception unit 156 of the control device 14 acquires the posture information regarding the HMD 100*a* detected by the posture sensor 124 of the HMD 100*a*. The motion detection unit 158 of the control device 14 detects, in a case in which the position of the HMD 100*a* in the height direction changes, a change amount thereof on the basis of the posture information regarding the HMD 100*a*.

The game image generation unit 152 of the control device 14 generates, in a case in which the position of the HMD 100*a* in the height direction changes beyond a predetermined range, second game images in place of the first game images. The game image transmission unit 154 transmits the second game images to the processing device 128*a*, to thereby cause the HMD 100*a* to display the second game images in place of the first game images. The predetermined range which is described above and is a threshold value for switching from the first game image to the second game image may be a range in which the positions (that is, the eye height) of the cameras 24 in the height direction in the robot 13 can change. As another example, the predetermined range described above may be an appropriate range determined based on knowledge of a developer and an experiment using the entertainment system 10.

Figure 13:
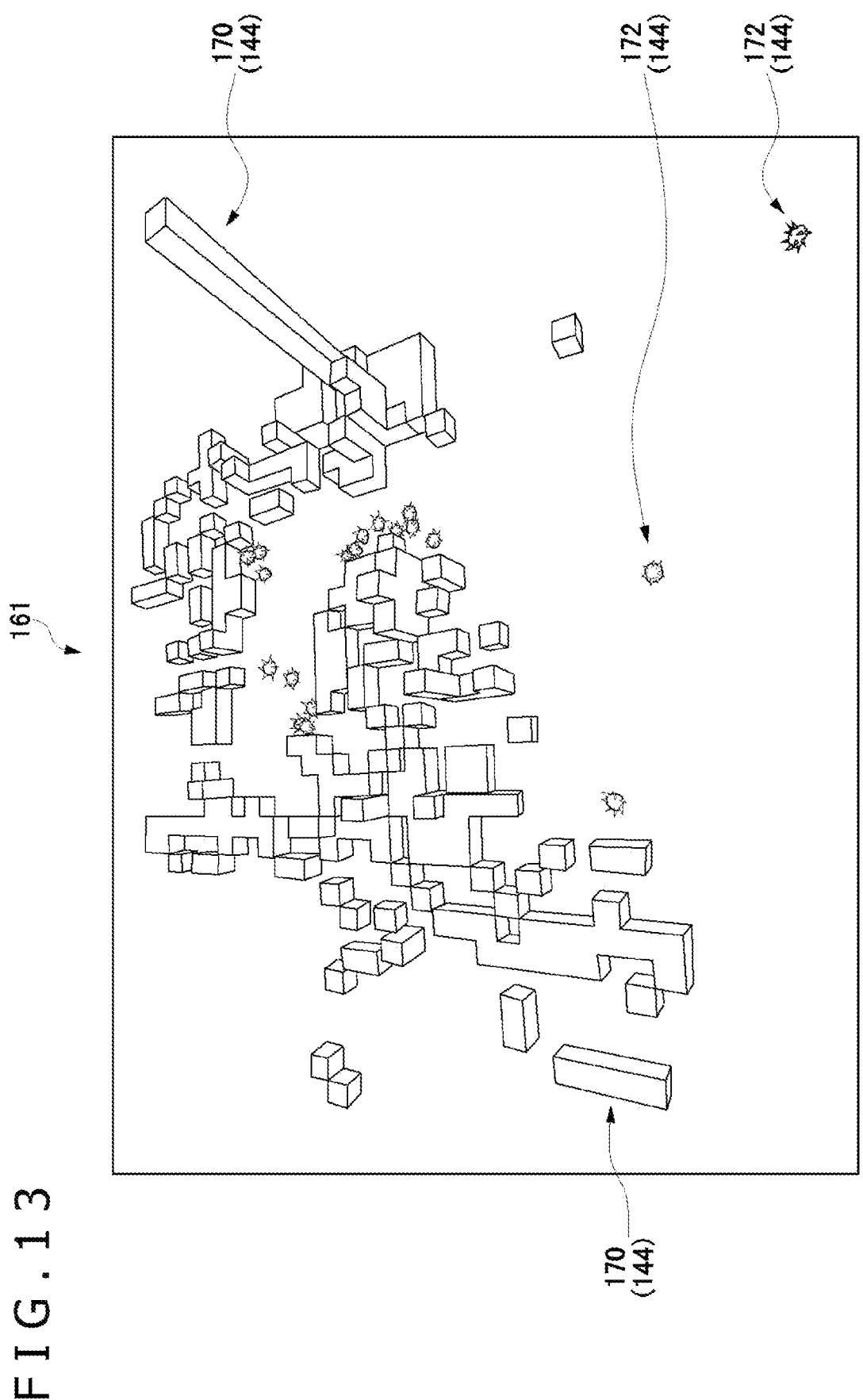
FIG. 13 is a view for illustrating an example of a second game image.

FIG. 13 illustrates an example of the second game image. A second game image 161 of FIG. 13 includes, as the virtual objects 144, the plurality of blocks 170 and the plurality of enemy characters 172. Moreover, the second game image 161 does not include the real objects 142 (the cup 168 and the like), which is different from the first game image 160. That is, the second game image is an image from which the objects in the real world are deleted, and is the VR image presenting exterior appearances of the virtual objects 144 observed from the new view-point according to the change in the position of the HMD 100*a* in the height direction. Moreover, the second game image is a game image obtained when the video see-through function of the HMD 100*a* is disabled.

The second game image 161 of FIG. 13 is typically displayed in a case in which the user viewing the first game image 160 in a sitting posture stands up and the position of the HMD 100*a* in the height direction changes from down to up. The game image generation unit 152 of the control device 14 generates, in a case in which the position of the HMD 100*a* in the height direction changes from the down to up, the second game image from which the objects in the real world are deleted and which presents the exterior appearances of the virtual objects 144 observable from a view-point at a position higher than that of the view-point in the first game image. The game image 161 of FIG. 13 can also be considered as a bird's-eye image. Note that the view-point at the higher position may be a view-point of the user standing up, in other words, may be the eye height of the user.

The first game image 160 can be considered as an image having the view-point of the robot 13 as a reference while the second game image 161 can be considered as an image having the view-point of the user as a reference. The game image generation unit 152 may arrange, when the first game image 160 is to be generated, a virtual camera at a center of a coordinate system, and a direction of an optical axis of this virtual camera may be matched with a direction of an optical axis of the camera 24 of the robot 13. The game image generation unit 152 may arrange, in the coordinate system described above, images of the real objects 142 captured by the cameras 24 of the robot 13 and the virtual objects 144 arranged by the user operation, may then image them by the virtual camera, and may generate the first game image 160 on the basis of an imaging result.

Meanwhile, the game image generation unit 152 may change, when the second game image 161 is to be generated, the position of the virtual camera to a position higher than a previous position, according to the change amount of the position of the HMD 100*a* in the height direction. The game image generation unit 152 may image, from the virtual camera at a relatively higher position, the real objects 142 and the virtual objects 144 at relatively lower positions, and may generate the second game image 161 on the basis of an imaging result thereof.

With the entertainment system 10 according to the second embodiment, even in a case in which the height position of the HMD 100 changes, it is possible to suppress the sense of discomfort felt by the user viewing the game image, to thereby suppress the what is generally called VR sickness that the user may experience. As a result, the user experience achieved by the cooperation between the tele-existence and the HMD 100 can be improved. Note that the technology described in the second embodiment is not limited to the case in which the cameras 24 are mounted to the robot 13. This technology is widely useful in a case in which the images (videos) captured by the cameras 24 are displayed in the HMD 100 and the change in positions of the cameras 24 in the height direction is limited (or the positions of the cameras 24 in the height direction do not change).

The present invention has been described based on the first embodiment and the second embodiment. These embodiments are illustrative, and it is to be understood by those who are skilled in the art that changes and variations may be made in the combinations of the components and that the processing processes thereof and these changes and variations are also within the scope of the present invention.

A description is now given of a first modification example. In the first embodiment, the data (the image, the various types of parameters, and the like) on the character selected by the user are transmitted from the user terminal 11 to the control device 14. As the modification example, the character data storage unit 70 of the control device 14 may store the plurality of pieces of the character data regarding the plurality of characters which the user can select, as the character data storage unit 70 of the user terminal 11 according to the first embodiment. The user terminal 11 may notify the control device 14 of identification information (a name, an identifier (ID), and the like) of the character selected by the user. The operation determination unit 80 of the control device 14 may refer to the character data regarding the character identified, among the plurality of pieces of character data stored in the character data storage unit 70, by the identification information transmitted from the user terminal 11, to thereby determine the operation modes of the robot 13.

A description is now given of a second modification example. In the second embodiment, the first game image and the second game image are displayed by the HMD 100a of the user, and a case in which these game images are displayed by the HMD 100b of the friend can be implemented by a similar configuration. In this case, it is only required to replace the "processing device 128a" described in the second embodiment by the "processing device 128b" and replace the "user operation information" described in the second embodiment by the "friend operation information."

A description is now given of a third modification example. The game image generation unit 152 of the control device 14 may generate, also in a case in which the position of the HMD 100 in the height direction changes from up to down, in place of the first game images, the second game images from which the real objects are deleted and which present the exterior appearances of the virtual objects observed from the new view-point according to the change in the position of the HMD 100 in the height direction, which is not described in the second embodiment. The second game image according to this modification example may be a second game image which presents the exterior appearances of the virtual objects observed from the view-point at a position lower than the view-point in the first game image.

A description is now given of a fourth modification example. The entertainment system 10 according to each embodiment may have a configuration which does not include the control device 14. In this case, the functions (for example, the operation determination unit 80 and the like) of the control device 14 described in the first embodiment and the second embodiment may be implemented in the robot 13 or may be implemented in the user terminal 11 (the entertainment application). As another example, some of the functions of the control device 14 described in the first embodiment and the second embodiment may be implemented in the robot 13, and the rest of the functions of the control device 14 may be implemented in the user terminal 11 (the entertainment application). In this modification example, there may be provided such a configuration that the user terminal 11 and the robot 13 communicate with each other via the communication network 15.

For example, the robot 13 according to the fourth modification example may include a character data reception unit (corresponding to the character data reception unit 74 of the control device 14 according to the embodiments) and an operation determination unit (corresponding to the operation determination unit 80 of the control device 14 according to the embodiments). The character data reception unit may receive, from the user terminal 11, the information regarding the character selected by the user from the plurality of characters for which the personalities different from one another are defined. The operation determination unit may determine the operation modes of this robot 13 on the basis of the parameters corresponding to the personality of the character selected by the user.

A description is now given of a fifth modification example. The HMDs 100 (the HMD 100a and the HMD 100b) are caused to display the images (herein referred to as "robot view-point images") captured by the cameras 24 mounted at the view-point positions of the robot 13 in the embodiments described above. In the entertainment system 10 according to the modification example, the robot 13 or the control device 14 may transmit the robot view-point images to a terminal (such as a smartphone, for example, the user terminal 11) of the user or the friend, to thereby cause the terminal of the user or the friend to display the robot view-point images. In this case, the terminal (such as a smartphone, for example, the user terminal 11) of the user or the friend may transmit the user operation information or the friend operation information to the control device 14 or may directly transmit to the robot 13. As described above, the terminal of the user or the friend may be used to control the robot 13.

A description is now given of a sixth modification example. The character data stored in the character data storage unit 34 of the user terminal 11 may include the following parameters as the personality of the character. (1) A parameter for controlling whether or not the character finds, by priority, a toy such as a ball (in other words, whether or not reacts to the toys such as the ball). In the character data regarding the character having a characteristic which likes toys, there may be set, as a value of this parameter, a value indicating the reaction to toys such as a ball, by priority, on the basis of an image recognition technology. (2) A parameter for controlling whether or not the character reacts to peripheral sound (by increasing microphone sensitivity in such a manner as to be higher than normal microphone sensitivity) and starts to dance to the detected sound. In the character data regarding the character having a characteristic which likes the dance, there may be set, as a value of this parameter, a value indicating the increase in microphone sensitivity in such a manner as to be higher than the normal microphone sensitivity.

(3) A parameter for controlling whether or not voice is to be increased to be louder than normal voice. In the character data regarding the character having the personality which has loud voice, there may be set, as a value of this parameter, a value indicating an increase in sound output intensity from the speaker 28 to sound output intensity higher than the normal sound output intensity. In the entertainment system 10 according to this modification example, the operation determination unit 80 of the control device 14 may determine an operation mode (that is, an operation mode of the microphone 26 and the speaker 28 of the robot 13) relating to the sound on the basis of the parameter defined in advance as the personality of the character selected on the user terminal 11.

Any combination between the embodiments and the modification examples described above is also useful as an embodiment of the present invention. A new embodiment generated by the combination has the effects of both the embodiments and the modification examples to be combined. Moreover, it is also understood by a person skilled in the art that the functions to be provided by each of components described in claims are implemented by the sole component or a combination of the components described in the embodiments and the modification examples.

INDUSTRIAL APPLICABILITY

The present invention can be applied to an information processing device.

REFERENCE SIGNS LIST

10: Entertainment system
11: User terminal
13: Robot
14: Control device
24: Camera
30: Display unit
32: Camera
42: Display control unit
76: Imaged data reception unit
78: Object identification unit
80: Operation determination unit
84: Game generation unit
92: Robot operation reception unit
152: Game image generation unit
154: Game image transmission unit
158: Motion detection unit

The invention claimed is:

1. An information processing device comprising:
an acquisition unit that acquires an image in which an object in a real world captured by an imaging device appears;
an image generation unit that generates a first image in which a virtual object appears together with the object in the real world appearing in the image acquired by the acquisition unit and which presents an exterior appearance of the virtual object while a position of the imaging device is set as a view-point;
a display control unit that causes a head-mounted display to display the first image generated by the image generation unit; and
a detection unit that detects a change in a position of the head-mounted display in a height direction,
wherein, in a case in which the position of the head-mounted display in the height direction changes,
the image generation unit generates a second image from which the object in the real world is deleted and which presents the exterior appearance of the virtual object viewed from a new view-point according to the change in the position of the head-mounted display in the height direction, and
the display control unit causes the head-mounted display to display the second image in place of the first image.

2. The information processing device according to claim 1, wherein the image generation unit generates, in a case in which the position of the head-mounted display in the height direction changes from down to up, a second image from which the object in the real world is deleted and which presents the exterior appearance of the virtual object viewed from a view-point at a position higher than the view-point in the first image.

3. The information processing device according to claim 1, wherein
the imaging device is mounted to the robot, and
the robot is configured such that the position of the imaging device in the height direction does not change beyond a predetermined range.

4. An information processing method executed by a computer, comprising:
acquiring an image in which an object in a real world captured by an imaging device appears;
generating a first image in which a virtual object appears together with the object in the real world appearing in the image acquired in the acquisition and which presents an exterior appearance of the virtual object while a position of the imaging device is set as a view-point;
causing a head-mounted display to display the first image generated by the generation;
detecting a change in a position of the head-mounted display in a height direction;
generating, in a case in which the position of the head-mounted display in the height direction changes, a second image from which the object in the real world is deleted and which presents the exterior appearance of the virtual object viewed from a new view-point according to the change in the position of the head-mounted display in the height direction; and
causing the head-mounted display to display the second image in place of the first image.

5. A non-transitory, computer readable storage medium containing a computer program, which when executed by a computer, causes the computer to perform information processing method by carrying out actions, comprising:
acquiring an image in which an object in a real world captured by an imaging device appears;
generating a first image in which a virtual object appears together with the object in the real world appearing in the image acquired by the acquisition and which presents an exterior appearance of the virtual object while a position of the imaging device is set as a view-point;
causing a head-mounted display to display the first image generated by the generation; and
detecting a change in a position of the head-mounted display in a height direction,
wherein, in a case in which the position of the head-mounted display in the height direction changes,
the generating includes generating a second image from which the object in the real world is deleted and which presents the exterior appearance of the virtual object viewed from a new view-point according to the change in the position of the head-mounted display in the height direction, and
the causing includes causing the head-mounted display to display the second image in place of the first image.

* * * * *